(12) United States Patent
Ives et al.

(10) Patent No.: US 9,383,940 B1
(45) Date of Patent: *Jul. 5, 2016

(54) TECHNIQUES FOR PERFORMING DATA MIGRATION

(71) Applicant: EMC Corporation, Hopkinton, MA (US)

(72) Inventors: Stephen Richard Ives, West Boylston, MA (US); John F. Madden, Jr., Holden, MA (US); Michael Dudnik, Newton, MA (US); Hagit Brit-Artzi, Framingham, MA (US); Roii Raz, Providence, RI (US); Hui Wang, Upton, MA (US); Gabi Hershkovitz, Newton, MA (US); Qun Fan, Northborough, MA (US); Ofer Michael, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/197,618

(22) Filed: Mar. 5, 2014

Related U.S. Application Data

(63) Continuation of application No. 12/586,925, filed on Sep. 29, 2009, now Pat. No. 8,706,960.

(51) Int. Cl.
*G06F 3/06* (2006.01)

(52) U.S. Cl.
CPC ............ *G06F 3/0647* (2013.01); *G06F 3/0604* (2013.01); *G06F 3/0688* (2013.01); *G06F 2003/0697* (2013.01)

(58) Field of Classification Search
CPC ... G06F 3/0619; G06F 3/0631; G06F 3/0646; G06F 3/0689
See application file for complete search history.

(56) References Cited

U.S. PATENT DOCUMENTS

| | | | | |
|---|---|---|---|---|
| 6,467,023 B1 * | 10/2002 | DeKoning | .......... | G06F 11/1092 711/114 |
| 6,715,054 B2 * | 3/2004 | Yamamoto | ............ | G06F 3/0613 711/112 |
| 8,706,960 B1 * | 4/2014 | Ives | ........................ | G06F 13/00 711/114 |
| 2005/0097287 A1 * | 5/2005 | Melament | ........... | G06F 11/1456 711/162 |
| 2007/0050573 A1 * | 3/2007 | Arakawa | ............. | G06F 11/2058 711/162 |
| 2007/0271313 A1 * | 11/2007 | Mizuno | ............... | G06F 11/1662 |

* cited by examiner

*Primary Examiner* — Edward Dudek, Jr.

(74) *Attorney, Agent, or Firm* — Muirhead and Saturnelli, LLC

(57) ABSTRACT

Described are techniques for performing data migration for a source logical volume and a target. The target is configured as storage for another mirror of the source logical volume prior to copying data from the source logical volume to the target, and if the target is configured storage of another logical volume of the data storage system, the configured storage is remapped as storage for another mirror of the source logical volume prior to copying data from the source logical volume to the target. One or more invalid bits are set indicating that the target does not contain a valid copy of data from the source logical volume. Data is copied from the first mirror of the source logical volume to the target. Invalid bits are cleared as data portions of the first mirror of the source logical volume are copied to the target.

20 Claims, 26 Drawing Sheets

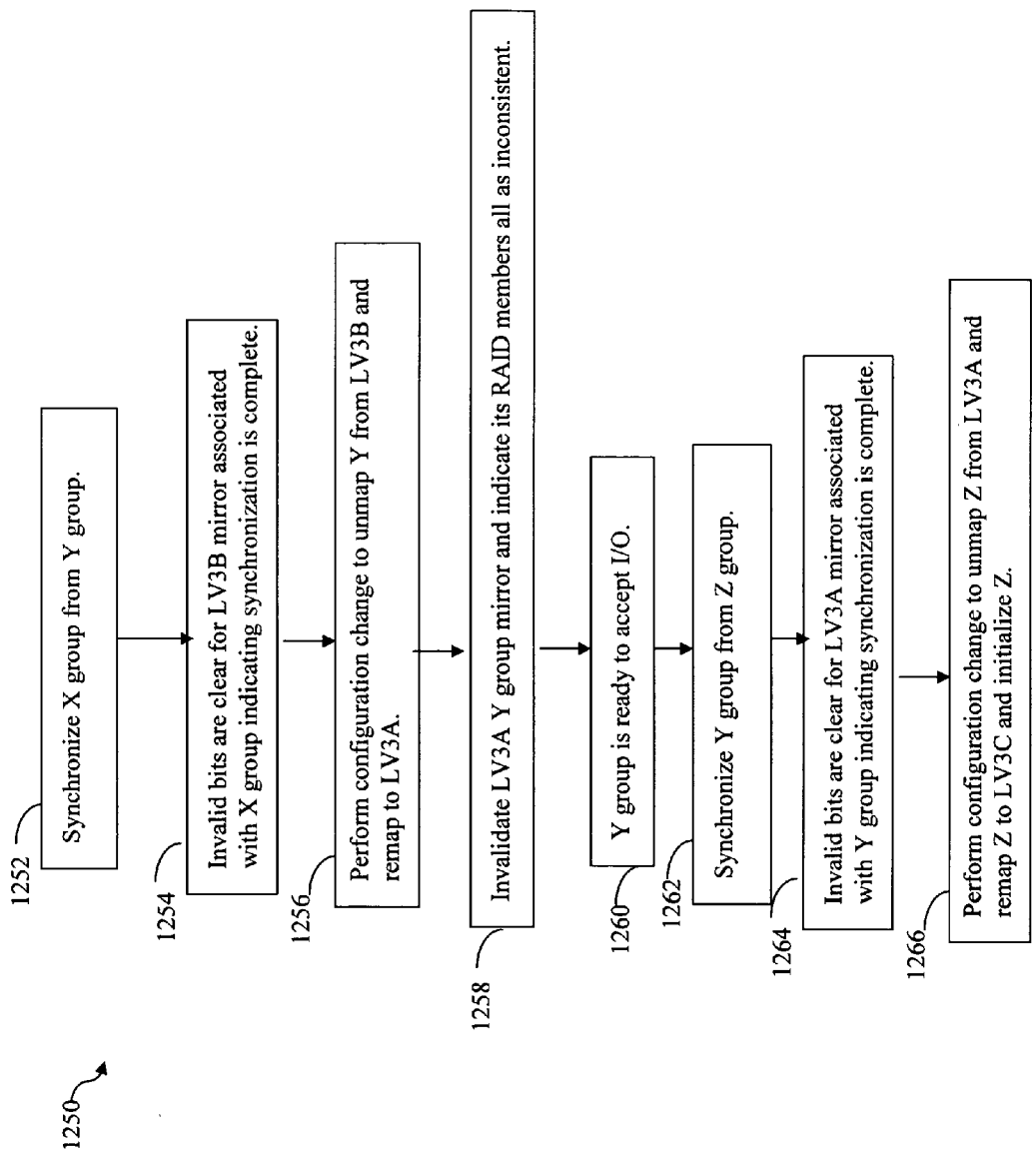

TECHNIQUES FOR PERFORMING DATA MIGRATION

CROSS REFERENCE TO RELATED APPLICATIONS

This application is a continuation of U.S. patent application Ser. No. 12/586,925, filed Sep. 29, 2009, TECHNIQUES FOR PERFORMING DATA MIGRATION, IVES et al., which is incorporated by reference herein.

BACKGROUND

1. Technical Field

This application generally relates to data storage, and more particularly to techniques used in connection with data migration.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

At various times, there may be a desire or need to migrate data from one location to another, such as migration of user data from a source logical volume to a target logical volume, or to swap a first logical volume with that of a second logical volume (e.g., so that data of the first logical volume is stored in the storage area of the second logical volume, and vice versa).

One technique that may be utilized includes making the source volume unavailable for use such as to an application, copying the data to the target volume, and then making the data on the target volume available for use by the application. The foregoing may be undesirable or unacceptable due to application usage requirements and expectations as well as regulatory requirements. For example, the foregoing may require stopping and then restarting the application to use the data from the new target logical volume. It may be desirable to have such data migration occur with minimal disruption and as transparently as possible with respect to applications and other software using and processing such data.

SUMMARY OF THE INVENTION

In accordance with one aspect of the invention is a method for a computer implemented method for performing data migration in a data storage system comprising: identifying a source logical volume of the data storage system, said source logical volume having at least a first mirror; identifying a target included in the data storage system, wherein if the target is unconfigured storage of the data storage system, the target is configured as storage for another mirror of the source logical volume prior to copying data from the source logical volume to the target, and if the target is configured storage of another logical volume of the data storage system, the configured storage is remapped as storage for another mirror of the source logical volume prior to copying data from the source logical volume to the target; setting one or more invalid bits indicating that the target does not contain a valid copy of data from the source logical volume; and copying data from the first mirror of the source logical volume to the target and clearing one or more invalid bits as one or more data portions of the first mirror of the source logical volume corresponding to said one or more invalid bits are copied to the target. Each of the one or more invalid bits may be set to clear when a corresponding data portion of the first mirror of the source logical volume is written to cache and prior to destaging the corresponding data portion to a physical device upon which data of the target is stored. Setting the invalid bit may cause a disk adapter of the data storage system to perform said copying. The data migration may be performed without stopping I/O operations from an application accessing the source logical volume. The may be performed without interrupting a data replication service which replicates data of the source logical volume, the data replication service including at least one local replication service making a backup copy of data of the source logical volume at a same physical site as the data storage system or at least one remote replication service copying data of the source logical volume to another data storage system at another physical site. Storage for the first mirror of the source logical volume may have a first level of data protection, storage for the target may be attached as a second mirror of the source logical volume, and the storage of the second mirror may have a second level of data protection different from the first mirror. Data for the first mirror of the source logical volume may be stored on at least a portion of a first physical device having a first set of characteristics, storage for the target may be attached as a second mirror, and at least a portion of the storage of the second mirror may be on a second physical device having a second set of characteristics different from the first set. The first physical device for the first mirror may be one of a disk device or a flash-memory device and the second physical device for the second mirror may be the other of the disk device or the flash-memory device. The first physical device may have a first storage capacity and the second physical device may have a second storage capacity different from the first storage capacity. A first RAID group may provide said first level of data protection and may include the storage for the first mirror and a second RAID group may provide said second level of data protection and may include the storage for the second mirror. A first RAID group may include storage for the first mirror and storage mapped to another mirror of a logical volume other than the source logical volume. A first RAID group may include storage of the first mirror and unconfigured storage which is not currently mapped for use with any logical volume.

In accordance with another aspect of the invention is a computer implemented method of performing data migration between two logical volumes comprising: identifying a source logical volume configured to have data stored in a first physical storage area, a target logical volume configured to have data stored in a second physical storage area, and a third logical volume configured to have data stored in a third physical storage area; and performing first processing to copy data of the source logical volume stored in the first physical storage area to the second physical storage area, to copy data of the target logical volume stored in the second physical storage area to the first physical storage area, to remap the first physical storage area to the target logical volume, and to remap the second physical storage area to the source logical volume, said first processing including using the third physical storage area as a temporary storage area, said first processing including: mapping said third physical storage area to a mirror of the source logical volume; setting one or more invalid bits indicating that the mirror associated with the third storage area does not contain a valid copy of data of the source logical volume; and copying data from said first physical storage area mapped to another mirror of the source logical volume to the mirror of the source logical volume associated with the third physical storage area and clearing one or more invalid bits as one or more data portions of the another mirror corresponding to the one or more invalid bits are copied to the mirror. The first processing may include mapping the first physical storage area as a mirror of the target logical volume; setting one or more invalid bits indicating that the mirror associated with the first physical storage area does not contain a valid copy of data of the target logical volume; and copying data from the second physical storage area mapped to another mirror of the target logical volume to the mirror of the target logical volume associated with the first physical storage area and clearing one or more invalid bits as one or more data portions of the another mirror of the target logical volume corresponding to the one or more invalid bits are copied to the mirror of the target logical volume associated with the first physical storage area. The first processing may include mapping the second physical storage area as a mirror of the source logical volume; setting one or more invalid bits indicating that the mirror of the source logical volume associated with the second physical storage area does not contain a valid copy of data of the source logical volume; and copying data from the mirror of the source logical volume associated with the third physical storage area to the mirror of the source logical volume associated with the second physical storage area and clearing one or more invalid bits as one or more data portions of the mirror of the source logical volume corresponding to the one or more invalid bits are copied to the mirror of the source logical volume associated with the second physical storage area. A first of said first physical storage area, said second physical storage area and said third physical storage area may be included in a first RAID group having a first RAID group protection level and a second of said first physical storage area, said second physical storage area and said third physical storage area may be included in a second RAID group having a second RAID group protection level different than said first RAID group protection level. The first RAID group may include storage mapped for use with at least two different logical volumes.

In accordance with another aspect of the invention is a system comprising: a data storage system including one or more physical devices configured to stored data for a plurality of logical volumes including a source logical volume, a target logical volume, a third logical volume and a fourth logical volume; and a computer readable medium comprising executable code stored thereon for performing data migration between two of the plurality of logical volumes, the computer readable medium comprising code stored thereon for: identifying the source logical volume configured to have data stored in a first physical storage area, the target logical volume configured to have data stored in a second physical storage area, the third logical volume configured to have data stored in a third physical storage area, and the fourth logical volume configured to have data stored in a fourth physical storage area; and performing first processing to copy data of the source logical volume stored in the first physical storage area to the third physical storage area, to copy data of the target logical volume stored in the second physical storage area to the fourth physical storage area, to remap the third physical storage area to the target logical volume, and to remap the fourth physical storage area to the source logical volume. The first physical storage area may be associated with a first RAID group level of protection and the second physical storage area may be associated with a second RAID group level of protection different than the first RAID group level of protection. The first storage area may be associated with a RAID group having a RAID group level that is different from a RAID group level associated with said third storage area.

BRIEF DESCRIPTION OF THE DRAWINGS

Features and advantages of the present invention will become more apparent from the following detailed description of exemplary embodiments thereof taken in conjunction with the accompanying drawings in which:

FIGS. 14, 15, 16, 17, 18, 18A and 18B illustrate processing in connection with an logical volume swapping in one embodiment using techniques described herein.

DETAILED DESCRIPTION OF EMBODIMENT(S)

Figure 1:
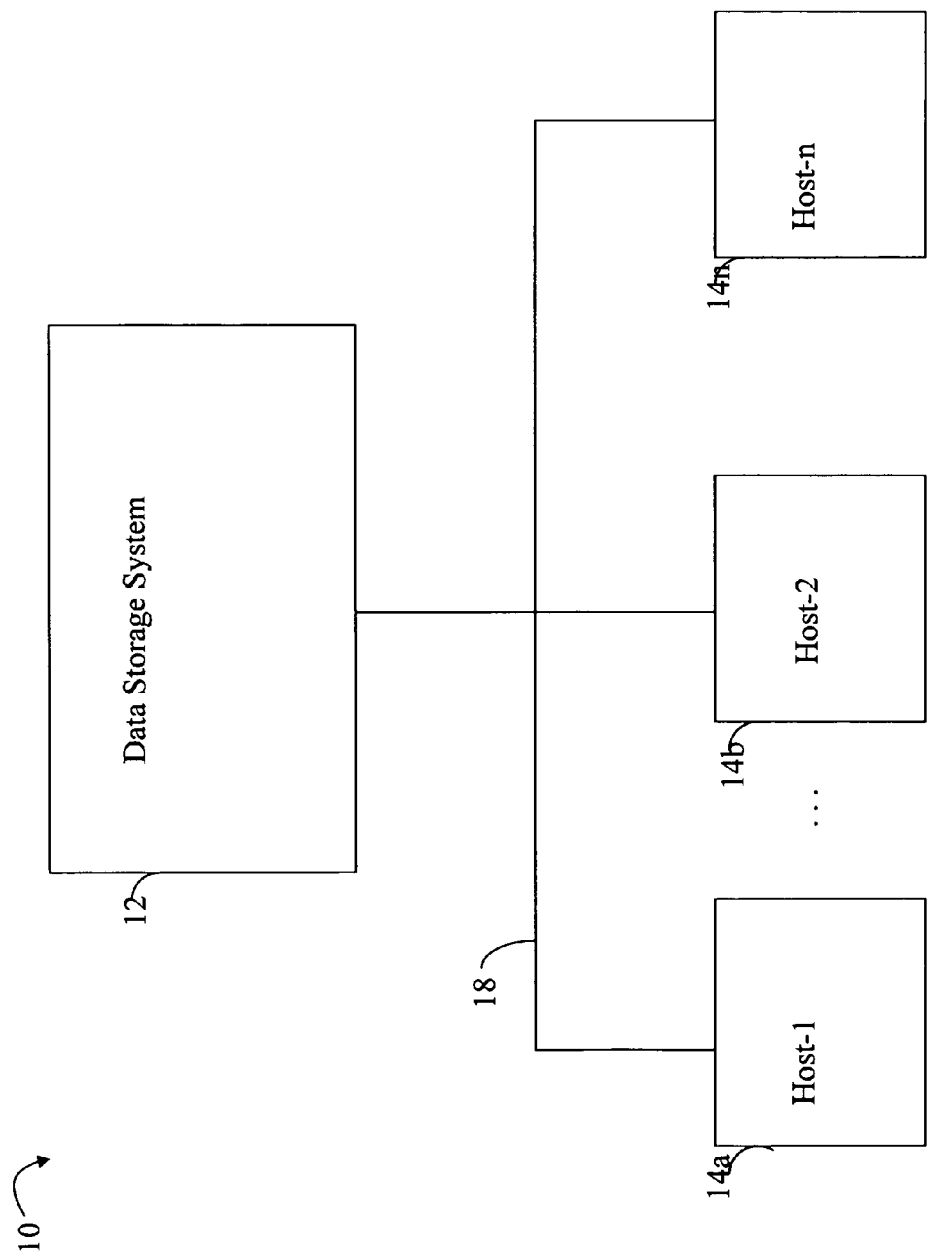
FIG. 1 is an example of an embodiment of a system and network that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
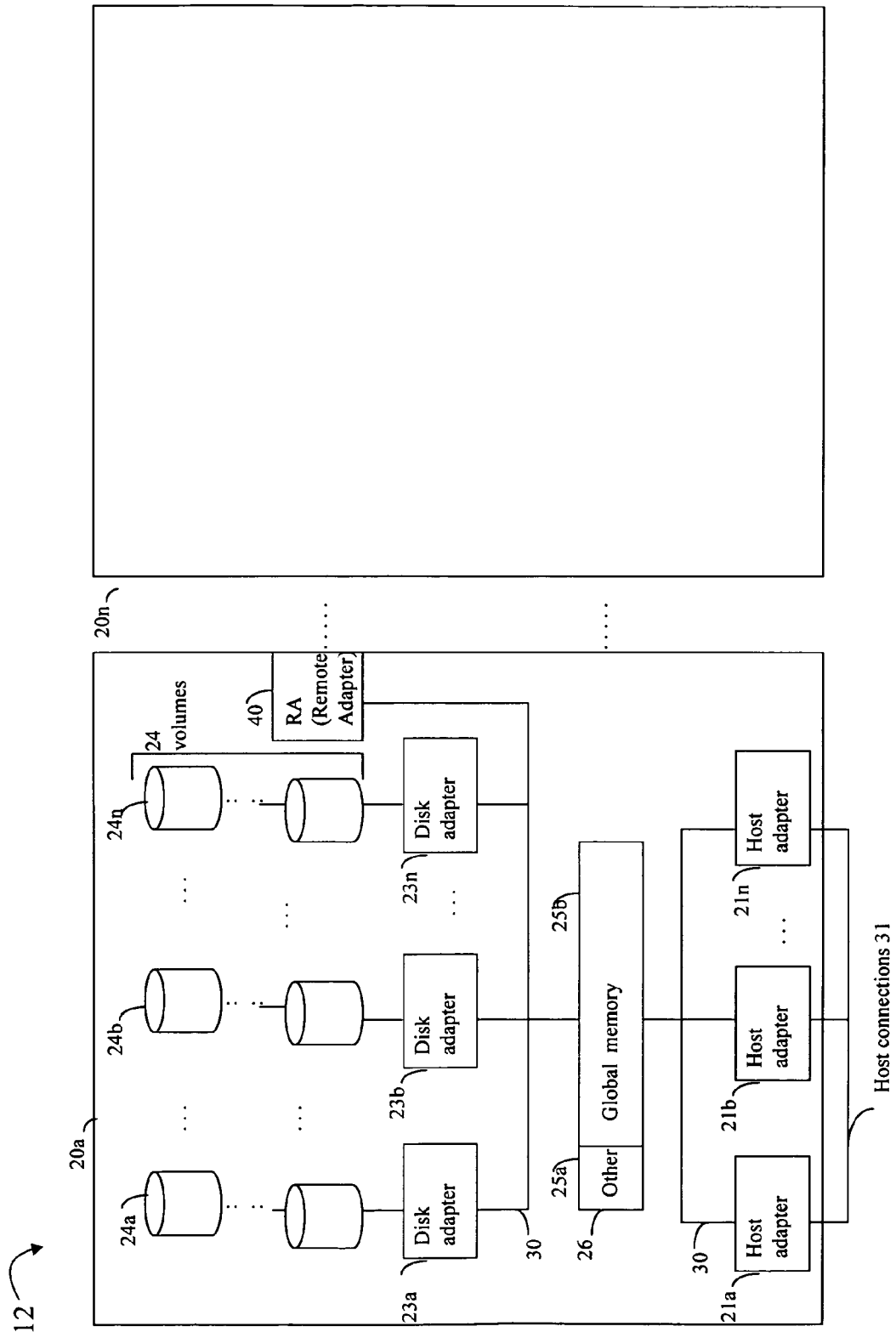
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein.

One or more internal logical communication paths may exist between the DA's, the RA's, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices (LDs) or logical volumes (LVs). The LVs may or may not correspond to the actual or physical disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. Data residing on an LV may be accessed by the DA following a data request in connection with I/O operations that other directors originate.

Figure 2B:
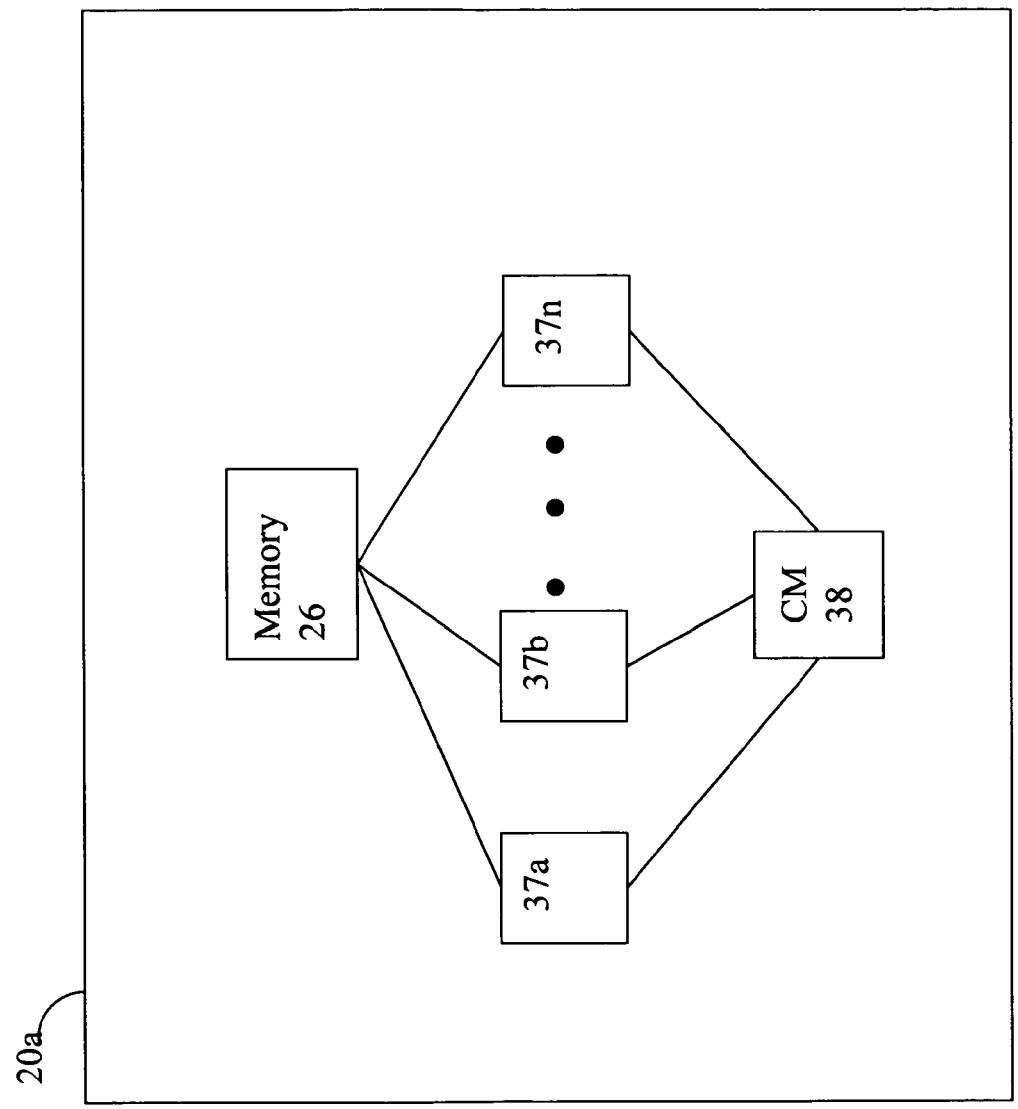
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 54 so that any one of the directors 37a-37n may send a message and/or data to any other one of the directors 37a-37n without needing to go through the memory 26. The CM 54 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

At various points in time, there may be a need or desire to migrate data, such as to migrate user data from a source LV to a target LV, or to swap a first logical volume with that of a second logical volume (e.g., so that data of the first logical volume is stored in the storage area of the second logical volume, and vice versa). It may be desirable for such migration to be performed in a transparent, non-disruptive manner with respect to applications and software that use the data. Described herein in following paragraphs are techniques that may be used in connection with performing a data migration, such as between LVs, where the source and target LVs may have the same or different type and/or level of data protection. For example, the source and target LVs may each have a different RAID type. The source and target LVs may be located on physical devices of the same or different type. For example, the source LV may be located on one of a flash drive, SATA disk drive, FC drive, and the like, and the target LV may be located on a different one of the foregoing types of devices. An embodiment in accordance with techniques described herein may perform the data migration so that no reconfiguration and/or rediscovery of data storage systems and devices are needed and wherein an application (such executing on a host) may continuously access and use the data during the migration process. In connection with the foregoing, the application I/Os of the data may not be suspended and rather, the application may be allowed to issue I/Os with respect to the data while the data is being migrated. An embodiment in accordance with techniques described herein may be perform data migration without suspending or interrupting local and/or remote replication services as may be used in connection with having a backup copy of data stored locally on the same data storage system or at a remote physical location. Different replication techniques are known in the art such as, for example, performing remote data replication using RDF (Remote Data Facility) by EMC Corporation. It should be noted that suspension or interruption of local and/or remote replication services may not be allowed in accordance with compliance or regulatory requirements.

In following paragraphs, the data migration techniques will be illustrated with respect to three use cases characterized as unconfigured space migration, configured space migration, and a data migration that is a swapping of data between a source and a target. The migration techniques are illustrated herein with respect to LVs. Configured space, or configured storage, may be characterized as storage which is provisioned and has user data stored thereon or is configured for use in storing user data. Configured space is storage of a data storage system that, for example, is mapped to an LV. In contrast to configured space is unconfigured space (or unconfigured storage). Unconfigured space is storage that has not been provisioned for use for storing user data and may include physical storage devices which are not yet mapped to an LV so that there is no user data stored thereon. In following examples for simplicity of illustration, various bits, indicators, and the like, are presented in connection with describing the data migration processing and state. Additional detail regarding exemplary data structures that may include such information and may be used in connection the data migration techniques described herein is then set forth.

An unconfigured storage migration will now be described as a first exemplary use of the techniques herein. With an unconfigured storage migration, data may be migrated from a first source LV to a target storage area of currently unconfigured storage which is currently not mapped to an LV (e.g., is part of unprovisioned storage) or is not otherwise configured for storing user data thereon.

Figure 3:
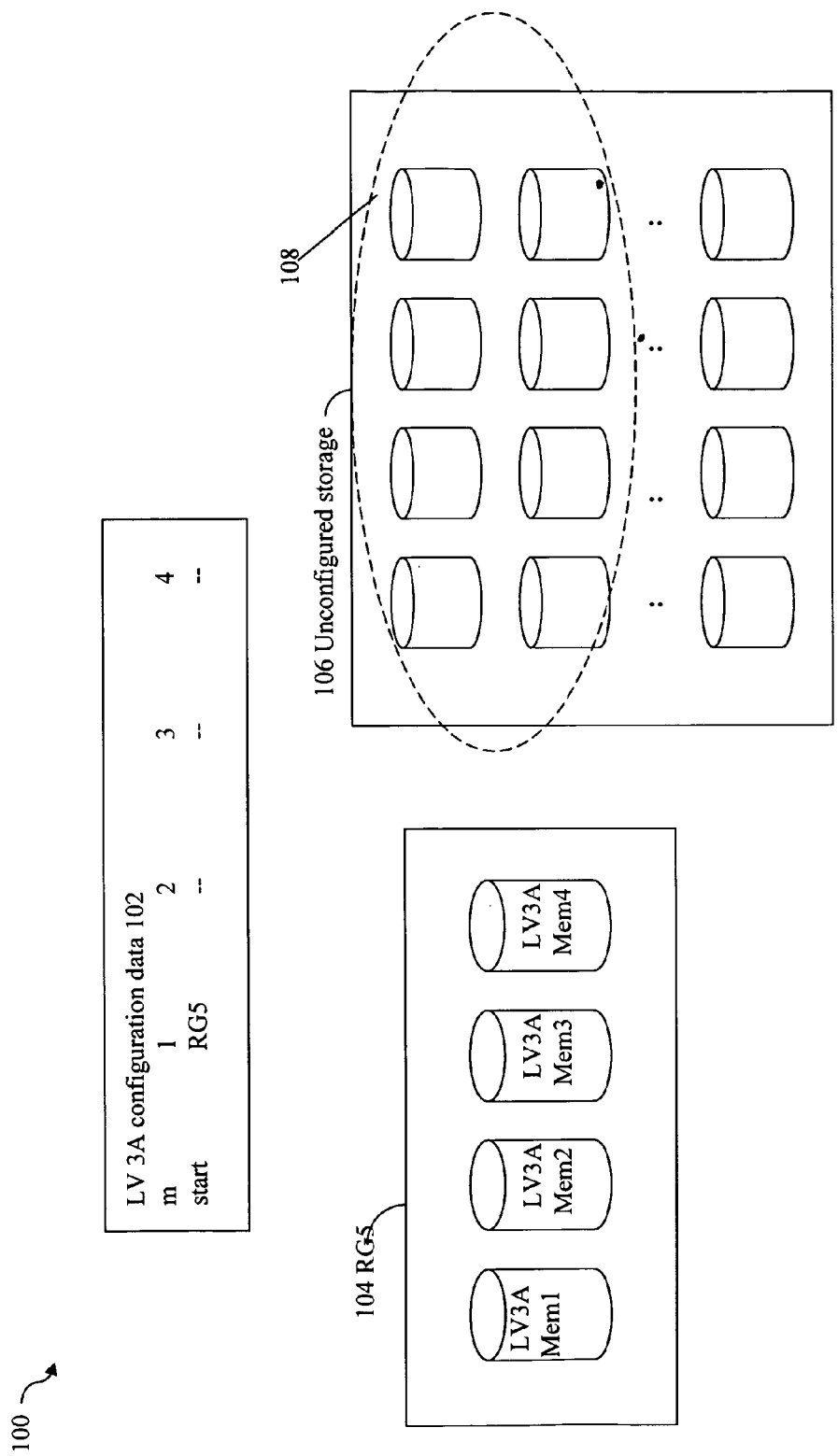
FIGS. 3, 4, 5, 6 and 6A illustrate processing in connection with an unconfigured data migration in one embodiment using techniques described herein.

Referring to FIG. 3, shown is an example 100 illustrating storage in connection with the unconfigured storage migration example prior to migration. In the example 100, the LV3A may include up to 4 mirrors as indicated by the configuration data 102, where each mirror location is denoted by an "m" (mirror position). As indicated by 102, mirror m1 is currently mapped for LV3A with unmapped or unused mirrors indicated by "--" in the mirror positions. Mirror m1 of LV3A is mapped to a RAID 5 group (denoted RG5). The storage for RG5 is represented by 104. As known in the art, there are a number of different RAID (Redundant Array of Independent or Inexpensive Disks) levels and techniques that may be used in connection with providing a combination of fault tolerance and/or improved performance for data storage devices. For example, RAID-5 techniques can be used in connection with a data storage system to protect from a single device failure with block level striping and distributed parity information, and RAID-6 provides protection from two devices of the RAID group failing with two sets of distributed parity and block level striping. The particular RAID levels described herein are merely exemplary and not a limitation of the techniques described herein.

The storage 104 for RG5 includes 4 RAID group members for a 3×1 RAID configuration of 3 data members and 1 parity member. Any RAID 5 protection technique may be used. Data from LV3A m1 will be migrated to storage of RAID-6 group (represented by element 108) which will be newly created in subsequent processing steps from the unconfigured storage 106.

Figure 4:
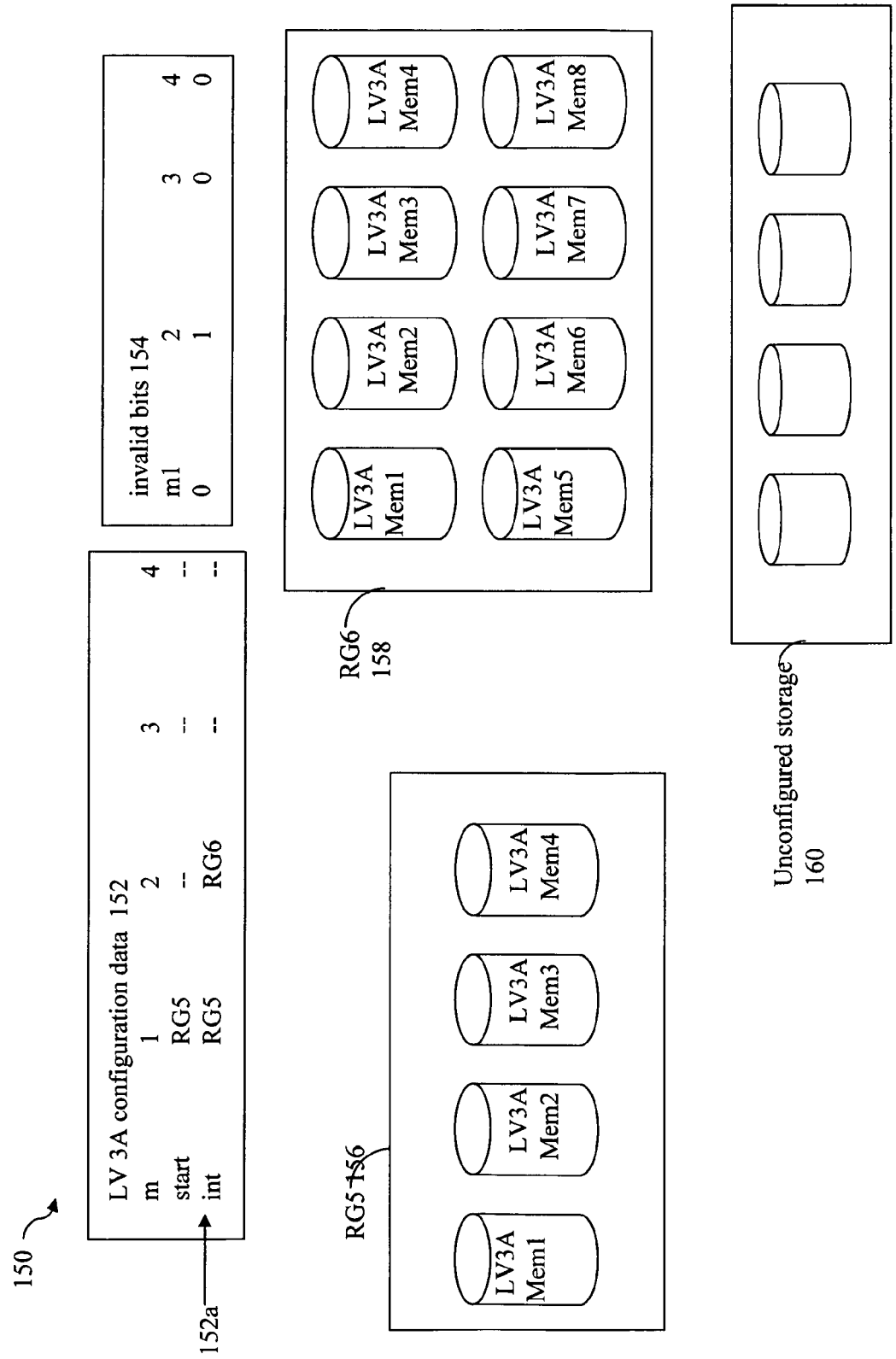

Referring to FIG. 4, shown is an example illustrating creating and mapping the RAID-6 group in connection with unconfigured storage migration. The RAID-6 group (denoted RG6) 158 is created by allocating storage for 8 members from unconfigured storage. In this example, the RAID-6 group is a 6×2 configuration with 6 data members and 2 parity members. Any RAID-6 protection technique may be used. For example, an embodiment may use the RAID-6 protection technique as described in U.S. patent application Ser. No. 11/167,704, filed Jun. 27, 2005, Fan, et al., TECHNIQUES FOR FAULT TOLERANT DATA STORAGE, which is incorporated by reference herein, or the technique described in "EVEN-ODD: An Efficient Scheme for Tolerating Double Disk Failures in RAID Architectures", IEEE Transactions on Computers, Vol. 44, No. 2, February 1995, by Blaum et al., as well as other techniques for RAID-6 and other RAID levels known in the art. An embodiment may use the techniques described in U.S. patent application Ser. No. 11/820,574, filed Jun. 20, 2007, TECHNIQUES FOR REPRESENTING AND STORING RAID GROUP CONSISTENCY INFORMATION, (the '574 application) which is incorporated by reference herein, along with a variation of data structures described therein, as set forth in more detail elsewhere herein.

In one embodiment a service processor connected to the data storage system may perform processing to track what portions of storage has not yet been provisioned or configured and select or allocate portions of such unconfigured storage for use with the RG6 being created.

Once RG6 is created, a configuration change to the LV3A configuration data is made where storage for RG6 is mapped to a mirror, m2, of LV3A as represented by 152*a*. RG6 is indicated as currently invalid as represented by the m2 position of element 154. Element 154 indicates the state of the invalid bits for each mirror position collectively where an invalid bit=1 means that the data of that mirror is invalid, is not up to date, and cannot supply a valid copy of the LV3A data such as in connection with servicing a read I/O operation for a track thereof. Invalid=0 means that no updating of the data for the associated mirror is necessary. Invalid=0 may occur when the mirror position is not in use as well as when a mirror is in use but does not require updating (e.g., can supply a valid copy of the LV3A data). As described in more detail elsewhere herein, each LV may include multiple tracks and an embodiment may store an invalid bit for each track. In such an embodiment, each of the invalid bit values of 154 corresponding to a single mirror may collectively represent an invalid state with respect to all tracks of the LV3A's respective mirror positions (e.g., invalid bit m2=1 means that one or more tracks of data for this mirror are invalid; Invalid bit m2=0 means the all tracks of data for this mirror are valid). In an embodiment in which an invalid bit is associated with each individual data track, the invalid bit associated with each track of m2 for LV3A is set as part of processing represented in connection with FIG. 4.

Additionally, since the RG6 group has just been created, it is also internally inconsistent across all slices for all members in that it has no user data stored thereon and also has no valid associated protection information. As described in the '574 application, physical consistency (PC) structures may be maintained for each RAID group where such PC information may only be used internally in maintaining the RAID group. The PC structures reflect the current internal state of the RAID group. In the event that the RAID group is unable to supply a valid copy of the user data, the invalid bit of an LV mirror mapped to the RAID group (using the RAID group storage so that LV data is stored in the RAID group) may be set (invalid=1).

After RG6 has been created, the LV3A configuration data 152 has been updated to map RG6 as a mirror of LV3A, and the PC structures and invalid bits accordingly updated, RG6 is ready to accept I/O operations. It should be noted that at this point in time, no user data can be read from m2 of LV3A (RG6) since none has yet been written thereto. However, m2 of LV3A is ready to accept write operations to write data.

Figure 5:
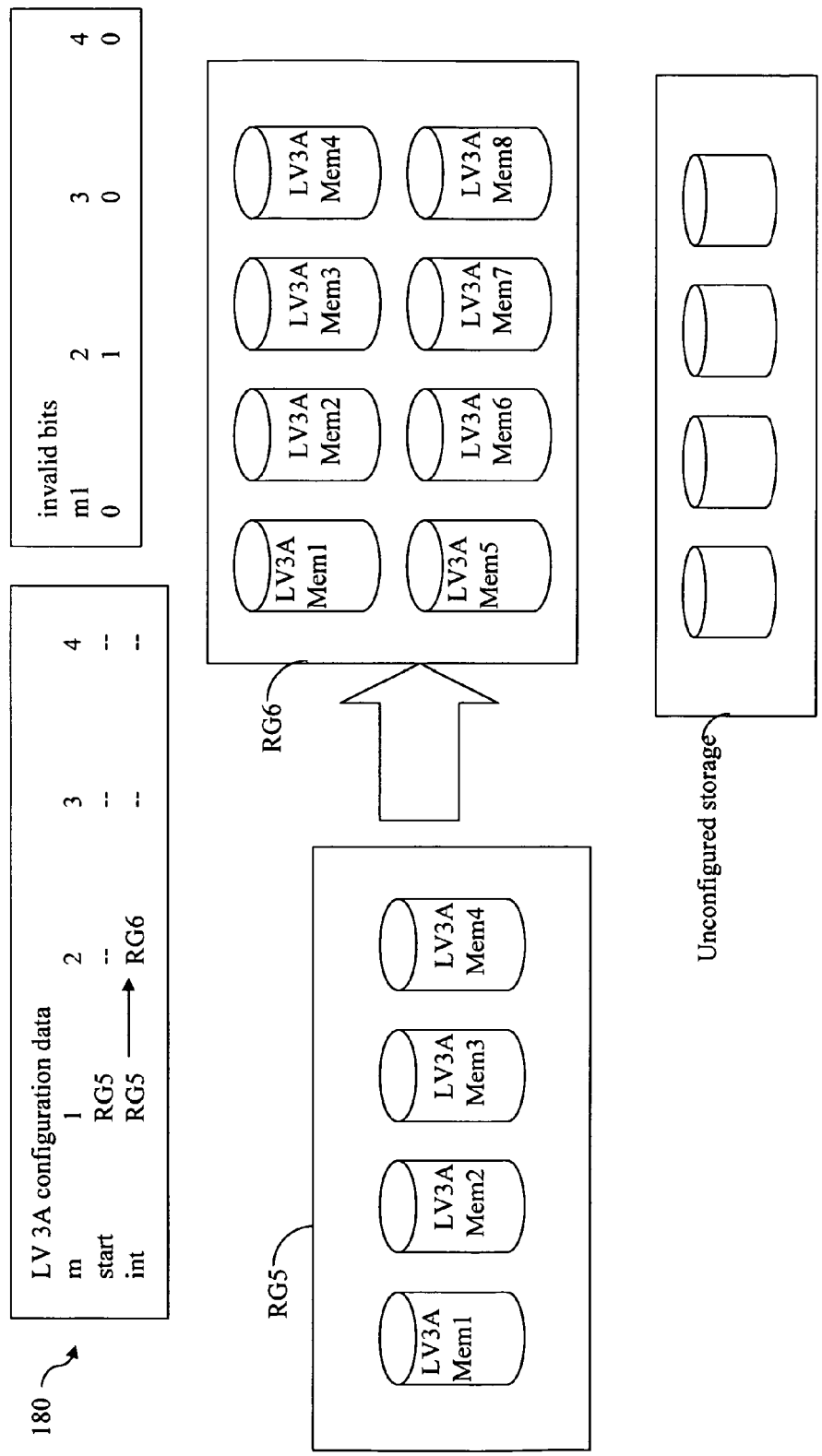

Referring to FIG. 5, shown is an example illustrating a next processing step in unconfigured storage migration where data synchronization of the newly created RG6 is performed. In the example 180, RG6 (LV3A m2) is synchronized from RG5 (LV3A m1). The synchronization processing may be performed by the DA executing a task, such as a background task, looking for invalid bit settings=1. The foregoing task may continuously monitor the status of the mirror invalid bits for all drives serviced by the DA. When a mirror of an LV is found having an associated invalid bit=1 indicating that the data of the mirror is invalid and requires updating, processing may be performed to accordingly update the mirror using data of another valid mirror for the LV. In other words, the task may perform processing to copy data from a valid mirror (such as m1 RG5 for LV3A) to the invalid mirror (such as m2 RG6 of LV3A). In one embodiment with reference to FIG. 5, data from m1 LV3A may be retrieved from physical storage, stored in a cache slot which is indicated as write pending (WP) with respect to m2 LV3A, and then destaged at a later point in time to the physical storage device for m2 LV3A. The foregoing may be performed with respect to each track of data of m1 to be written to m2 of LV3A. In such an embodiment, the DA may clear the invalid bit for a track when that track of data from m1 is stored in cache and may not yet have been destaged or written out to the physical storage device for m2 LV3A.

It should be noted that with respect to a very first track of data from m1 being stored in cache which has not yet been destaged (indicated as WP), the corresponding PC structures for the RG6 group at this time indicate that all m2 user data and protection data is inconsistent since no user data has yet been written out until the first track has been destaged. Part of destaging includes writing out the user data and also any protection information.

In an embodiment in accordance with techniques herein, each mirror can have a different RAID protection level (e.g., RAID-0, 1, 5, 6, and so on) and also different RAID protection schemes/algorithms so that different processing may be performed as part of destaging in accordance with the foregoing. For example, for the first track written out to the RG6 group m2, only user data for the first track is available and there may be insufficient information to compute necessary parity information. Thus, in destaging the first track, the user data may be destaged without any associated parity information so that the PC structure for the RAID group indicates the user data as consistent but the PC structure may still indicate that the associated parity information for this first track of data is inconsistent.

As described above in connection with destaging cached data, the writing of the data to physical devices may be performed independently and asynchronously with respect to when the data is stored in the cache. Other embodiments may use other techniques in connection with validating or verifying that the user data will be or has been stored on the physical device for the mirror m2.

Figure 6:
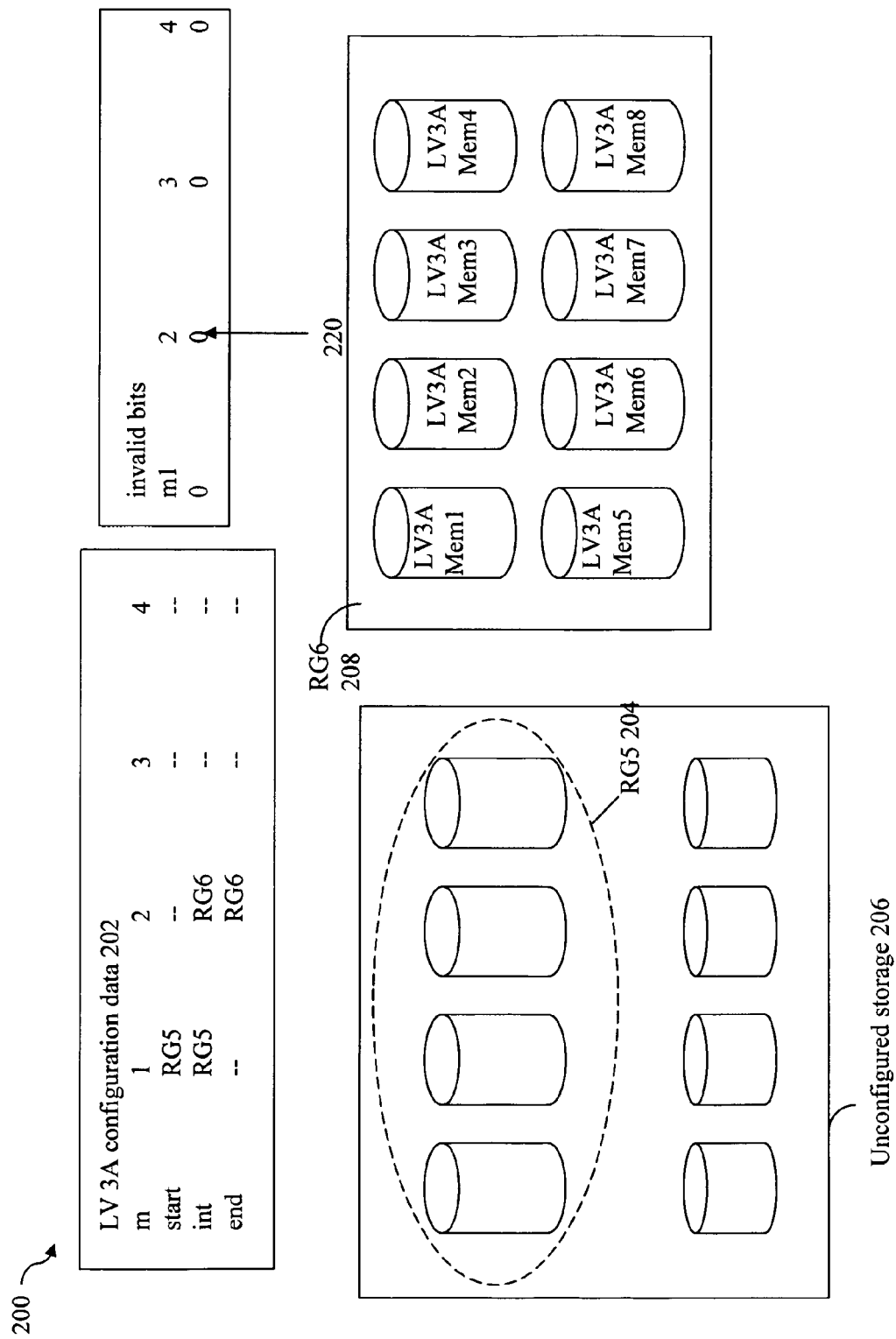

At this point, the progress of the synchronization of RG6 m2 from RG5 m1 is monitored until, for all tracks in the LV3A, the invalid bits for the newly added mirror m2 (RG6) =0. This is represented in FIG. 6 by element 220. Once all invalid bits for all tracks of m2=0, a configuration change for LV3A is performed to remove RG5 from the LV3A configuration data by unmapping RG5 from LV3A's m1 position as indicated in the end state (last entry/line) of 202. Storage for RG5 204 is then returned to the pool of unconfigured storage 206. Storage for RG5 may be reinitialized prior to being placed in the unconfigured storage for reuse.

As described above, the source LV of the data migration may have a same or different protection level than the target location of the data migration. A protection level may be, for example, a RAID protection level as well as an LV which is unprotected. Additionally, the source and target storage locations may be the same or different with respect to, for example, device type, attributes, performance characteristics, and the like. For example, the source and target locations may differ with respect to both protection and device type and attributes. The source data for LV3A may be stored on an SATA drive with RAID-5 protection. The foregoing source data may be migrated to a faster or different drive, such as a flash memory drive, having RAID-6 protection.

Figure 6A:
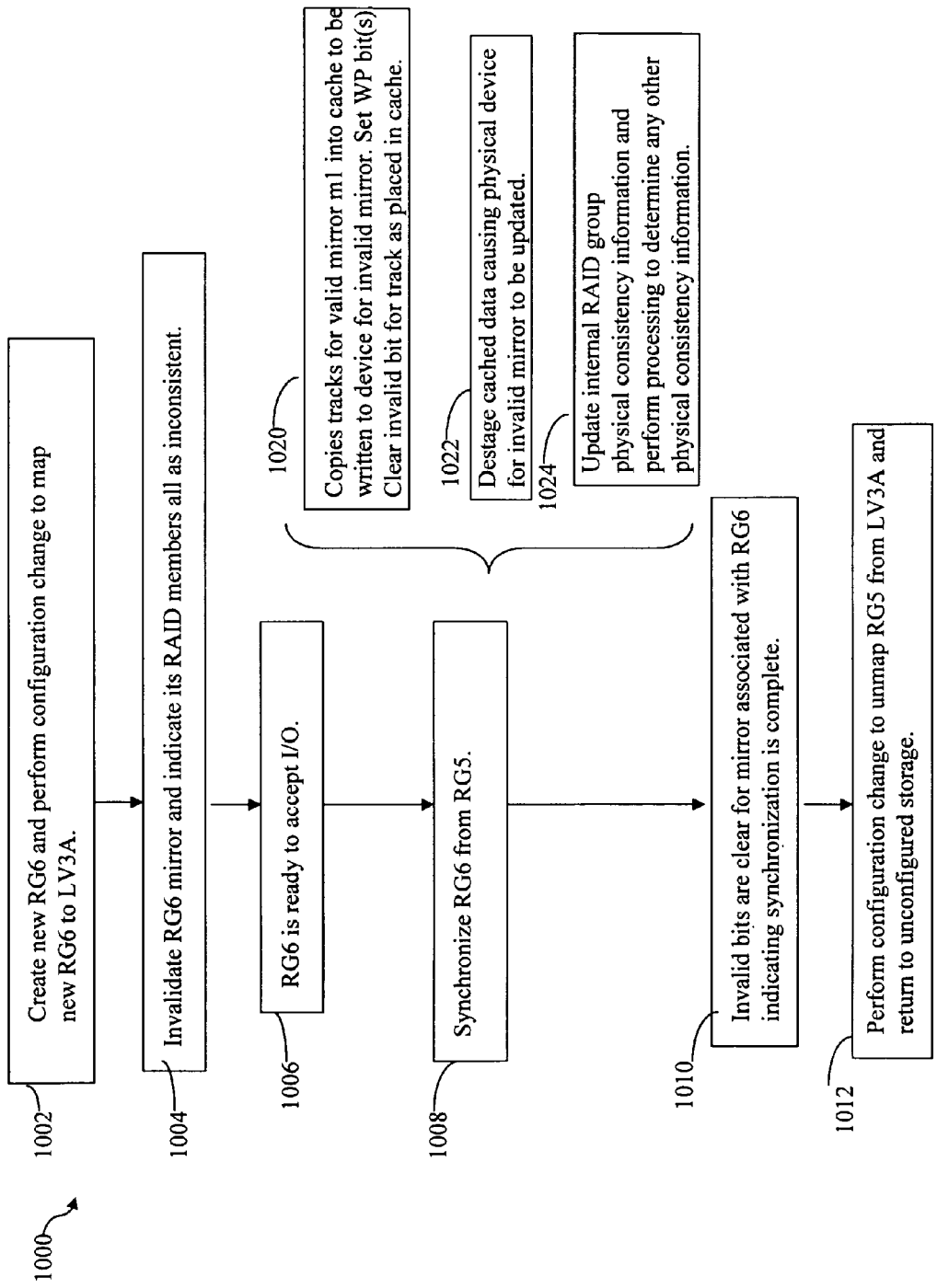

Referring to FIG. 6A, shown is a flowchart of processing steps as may be performed in an embodiment for unconfigured storage migration as just described above. The flowchart 1000 summarizes processing described above with reference to the particular example. However, it will be appreciated to those skilled in the art that the data migration techniques may also be applied in connection with other protection levels and variations than as described herein. Steps 1002, 1004 and 1006 are as described and illustrated above in connection with FIG. 4. At step 1002, the new RG6 (RAID-6 group) is created and a configuration change for LV3A is performed to map the new RG6 to a mirror of LV3A. It should be noted that the RG6 may already be created or have storage allocated for use with a RAID-6 group. However, in connection with the unconfigured storage migration example, storage of RG6 in step 1002 is not yet mapped or associated with an LV. Therefore, storage of RG6 may be characterized as unconfigured. At step 1004, processing is performed to invalidate the RG6 mirror (e.g., per setting invalid bits for all tracks of the mirror m2) and indicate the RAID members of RG6 all as inconsistent (e.g., per the PC structures used internally by the RAID group). At step 1006, RG6 is ready to accept I/O.

At step 1008, RG6 (m2 of LV3A) is synchronized from RG5 (m1 of LV3A). Synchronization of step 1008 may include performing steps 1020, 1022 and 1024. At step 1020, data for tracks of m1 (RG5) may be copied into cache to be written out and destaged to physical storage for m2 (RG6). As each track of data is read into cache, the associated cache entry containing the track of data has its WP bit set (indicating the cached data as write pending and needs to be destaged to physical storage associated with m2 RG6). Additionally, the invalid bit for the track of m2 is cleared after the data for the track from m1 has been stored in cache. At some subsequent point in time, the one or more tracks of cached data are destaged causing the physical device for the invalid mirror m2 to be updated as in step 1022. In step 1024, as part of destaging cached data, the internal RAID group PC information for RG6 is updated in accordance with the particular data being written to physical storage, the protection level and algorithm used, and the like. Step 1008, and associated substeps 1020, 1022 and 1024, are as described and illustrated above in connection with FIG. 5 and may be performed, for example, by a DA. Steps 1022 and 1024 may be performed asynchronously or independent of when the invalid bits for m2 are cleared. Step 1010 is performed after completion of step 1020 but completion of steps 1022 and/or 1024 is not needed in order to proceed to step 1010 in this exemplary embodiment.

In step 1010, the invalid bits for all tracks of the mirror m2 associated with RG6 are clear (=0) indicating that m2 contains a valid copy of all tracks of LV3A although there may be internal physical inconsistency within RG6 associated with m2. At step 1012, a configuration change is performed to unmap RG5 from m1 of LV3A and return storage of RG5 to unconfigured storage. Step 1010 and 1012 are described and illustrated above in connection with FIG. 6. It should be noted that, as described elsewhere herein, step 1012 may include reinitializing the physical disk contents of LV3A on RG5 prior to unmapping it from the configuration.

In connection with the foregoing example and others described herein, a single LV may be illustrated and included in a single RAID group. However, such a 1-1 relationship between an LV and a RAID group is not required. Rather, a single RAID group may more generally contain storage mapped for use with one or more LVs.

With reference to FIG. 6A, it should be noted that steps 1002, 1004 and 1006 may be initiated or driven by code executing on a service processor connected to a data storage system where such code instructs the data storage system to subsequently perform processing associated with the steps. Setting the invalid bit(s) for tracks of data in step 1004 causes the DA of the data storage system to perform the synchronization of step 1008. Code of the service processor may then perform the monitoring associated with step 1008 to determine when the state indicated by step 1010 is reached where all invalid bits for tracks of data for the invalid LV mirror m2 are cleared. Once the foregoing state is reached, code executing on the service processor may then update the LV configuration as described in step 1012 and accordingly instruct the data storage system to update its copy of data structures and the like to reflect the configuration change of step 1012. It should be noted that the foregoing steps as may be performed by the service processor may also be performed by the data storage system, such as a data storage array, or other component having connectivity thereto.

Figure 7:
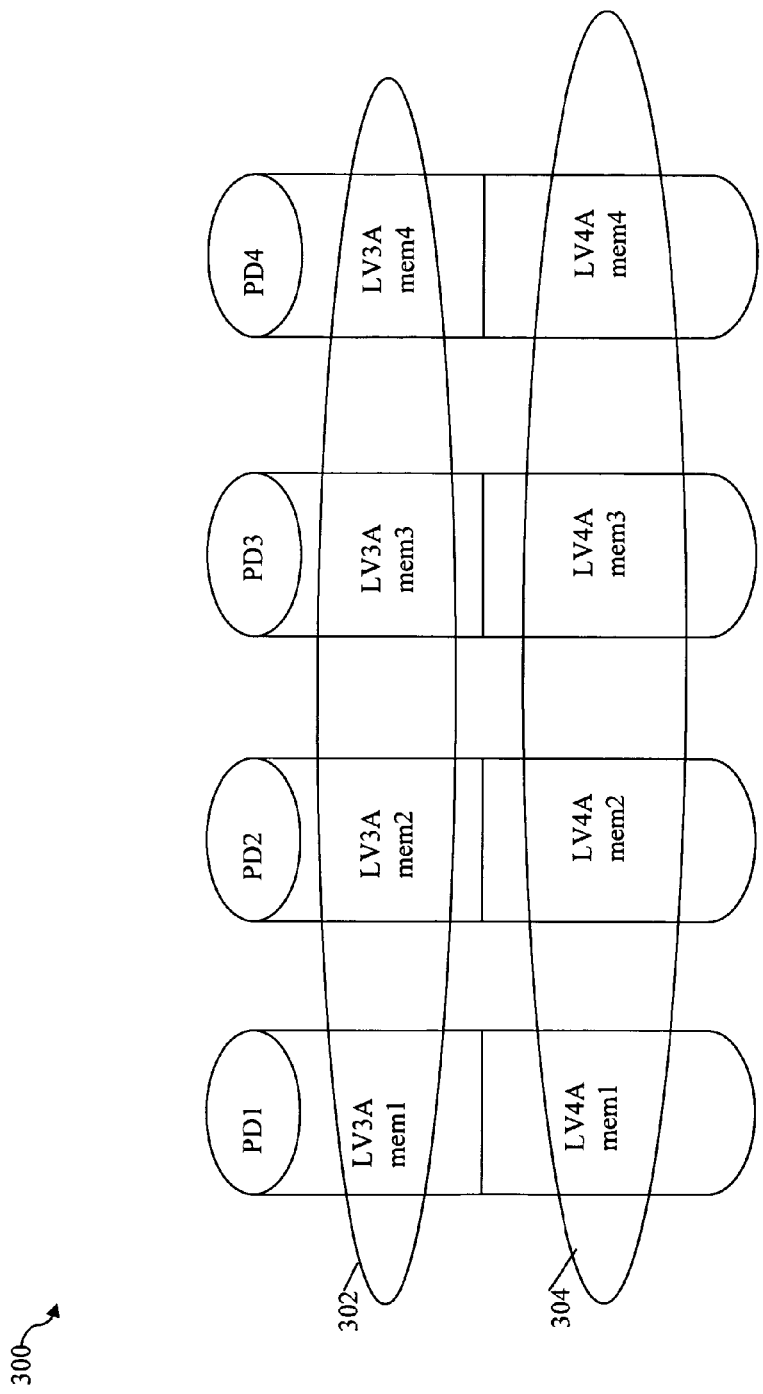
FIGS. 7, 8, and 9 illustrate exemplary representation of a RAID group which may include storage for one or more LVs and/or unconfigured storage in one embodiment in accordance with techniques herein.

Referring to FIG. 7, shown is an example illustrating storage for two LVs within a single RAID-5 group. In the example 300, a RAID-5 group may include four physical devices (PD1-PD4). A single physical drive (PD) may include one or more logical partitions of physical storage referred to as hypervolumes (HVs). Each HV may be mapped for use with a different LV. Each HV may have a different protection scheme (e.g., RAID 1, 6, etc., or unprotected). The HVs may be grouped together to form a RAID group. In the example 300, each PD may be partitioned into 2 HVs, for a total of 8 HVs for the 4 PDs. The RAID group illustrated may include the 8 HVs with 4 of the HVs (denoted 302) being mapped to a single mirror of a first LV, LV3A, and the remaining 4 HVs (denoted 304) being mapped to a single mirror of a second LV, LV4A. Each of LV3A and LV4A may use a single HV as a RAID group member so that LV3A and LV4A each utilize a RAID-5 protection scheme having a 3×1 configuration (3 data members and 1 parity or protection member with each member denoted by "mem" in the example). In such a configuration, storage for an LV within a RAID group may be specified using a RAID group identifier (uniquely identifying the RAID group from all other RAID groups), and a RAID group offset (specifying an offset or location within the identified RAID group at which data for the LV may be found). For purposes of simplification, examples described herein may refer to a single RAID group as being associated with an LV (or mirror thereof) without indicating a RAID group offset. However, it should be noted that storage for multiple LVs, or multiple mirrors of the same or different LVs, may be mapped to a single RAID group. In such cases, an additional RAID group offset may be used to more specifically identify where each LV is stored within a RAID group.

Figure 8:
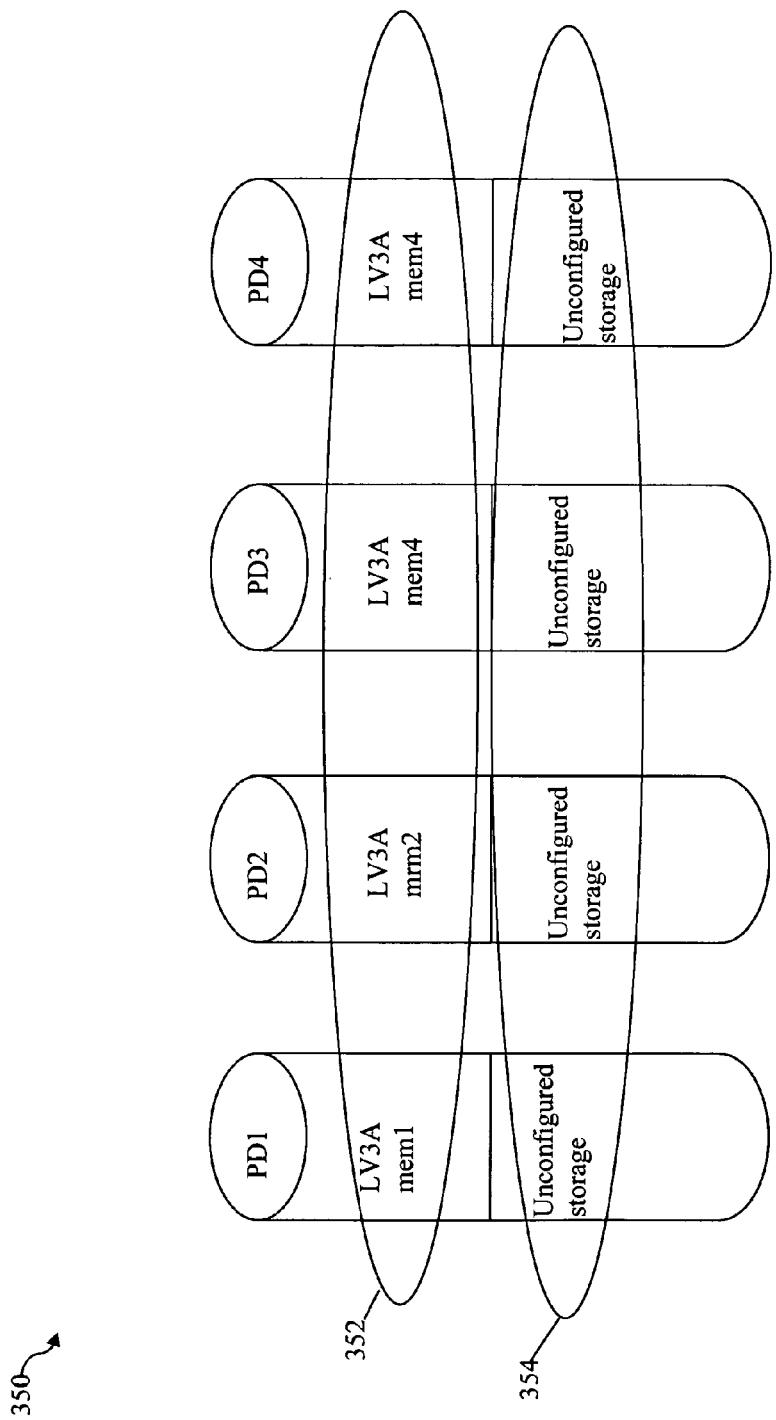

Referring to FIG. 8, shown is another example of a RAID group which may include storage for one or more LVs. In the example 350, the RAID-5 group is illustrated as again including 4 PDs where each PD includes two HVs. Four of the HVs (denoted 352) are mapped for use with LV3A with the remaining four HVs (denoted 354) mapped as unconfigured storage. The example 350 illustrates that the RAID-5 group may be created at a point in time and a portion of the storage thereof may be used for multiple LVs, a single LV and unconfigured space, and the like. Migration techniques described herein may be performed with respect to an LV so that migration may be performed, for example, for only those HVs of a first set associated with a single LV within the RAID group. The foregoing migration may be performed without affecting other HVs of the same RAID group that may be associated with other LVs or mirrors of the same LV.

Figure 9:
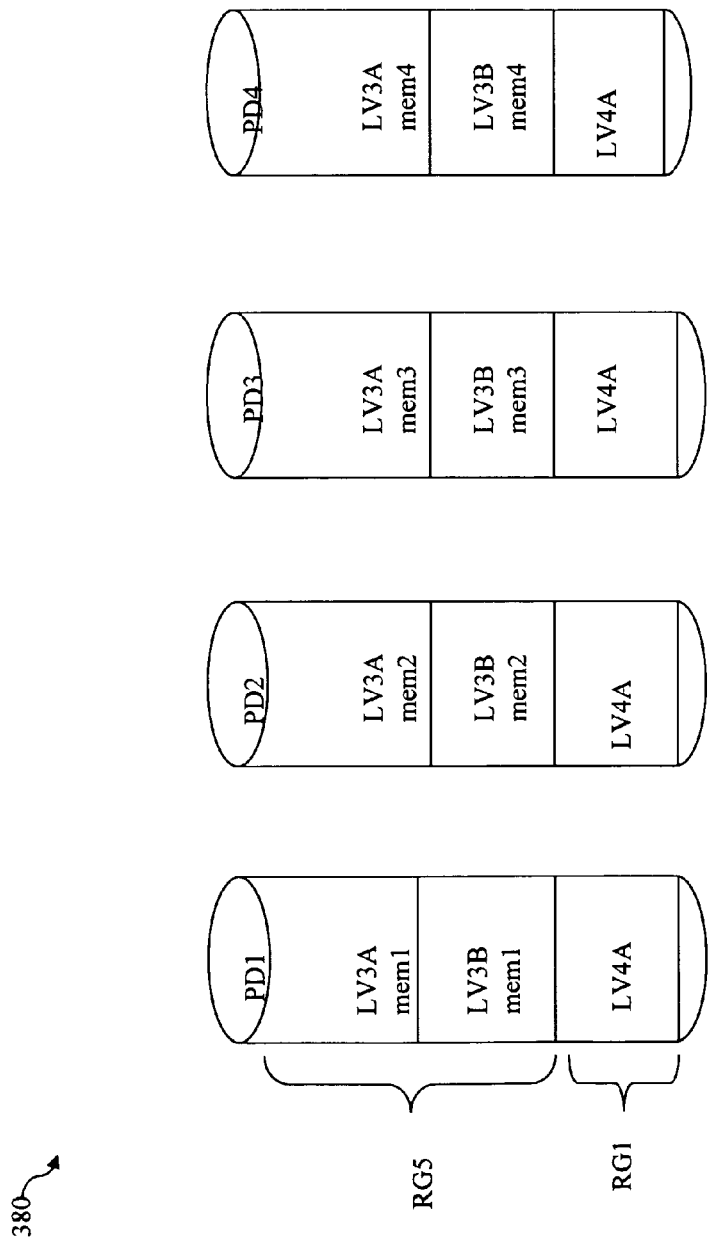

Referring to FIG. 9, shown is another example of a RAID group which may include storage for one or more LVs. In this example 380, the same four PDs are partitioned into 4 HVs and the four PDs include storage associated with two different RAID groups. A first RAID-5 group, RG5, is illustrated as including 8 HVs where 4 HVs (for a 3×1 RAID-5 configuration) are mapped for use with LV3A and the remaining 4 HVs are mapped for use with LV3B for a 3×1 RAID-5 configuration. A second RAID-1 group, RG-1, having 4-way mirroring (original and 3 mirrors), is illustrated as including 4HVs which are mapped for use with LV4A. The foregoing illustrates multiple RAID groups of different RAID protection levels on a same set of PDs. Using techniques herein, an embodiment may migrate data from one of the LVs (e.g., LV3A) mapped to a RAID group without migrating data from another LV (e.g., LV3B) mapped to the same RAID group. Migration occurs per LV within a single RAID group independently of how other storage in the RAID group is used (e.g., independent of other LVs that may be mapped to the same RG or independent of use of unconfigured RAID group storage).

What will now be described is a second example illustrating use of techniques described herein in connection with configured storage migration. In this example, both the source and target storage locations are currently configured and mapped to LVs. The target LV is overwritten with data from the source LV.

Figure 10:
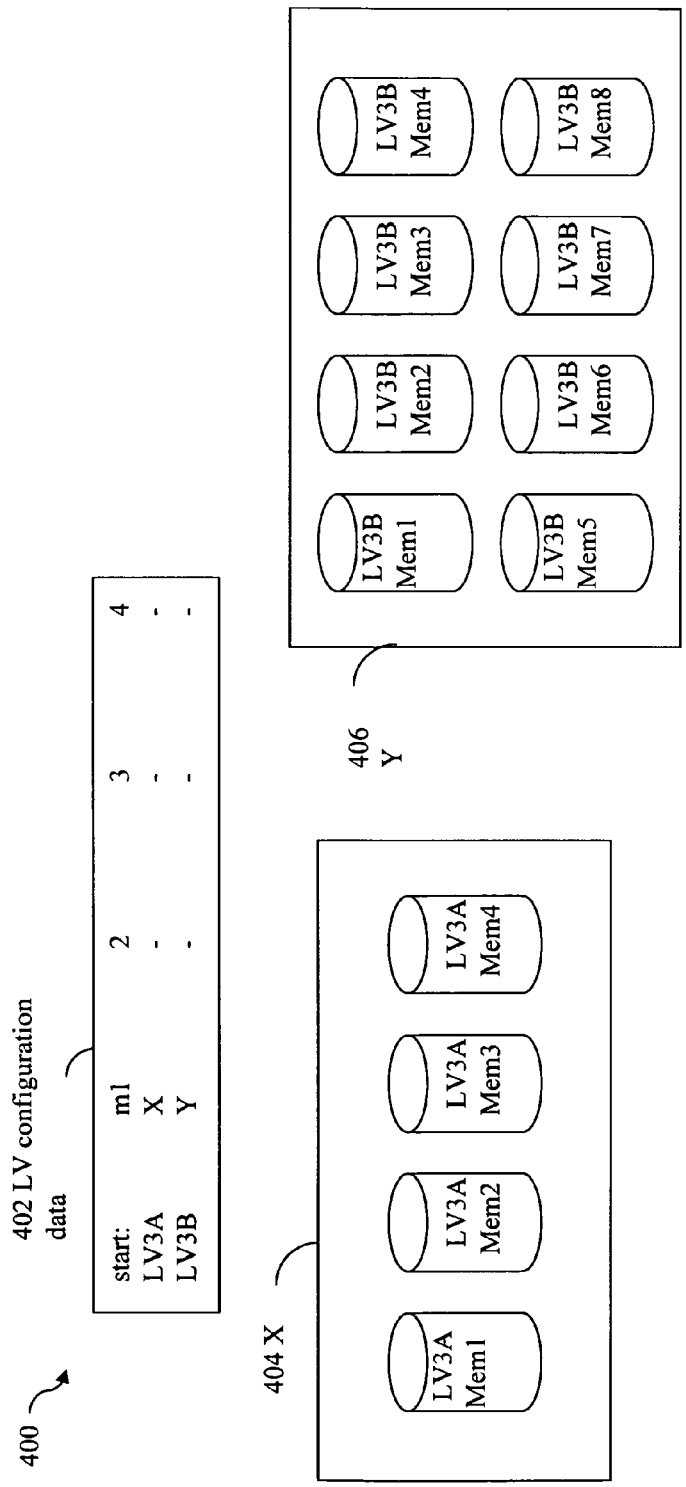
FIGS. 10, 11, 12, 13 and 13A illustrate processing in connection with configured data migration in one embodiment using techniques described herein.

Referring to FIG. 10, shown is an example of storage configuration prior to data migration. The example 400 includes LV configuration data 402 for LV3A and LV3B. LV3A has only a single mirror m1 associated therewith which is mapped to storage of a RAID-5 group (X 404) having a 3×1 RAID configuration. LV3B has only a single mirror m1 associated therewith which is mapped to storage of a RAID-6 group (Y 406) having a 6×2 RAID configuration. After completion of the data migration processing described below, data from LV3A will be stored on storage currently associated with LV3B where such storage is then remapped for use with LV3A.

Figure 11:
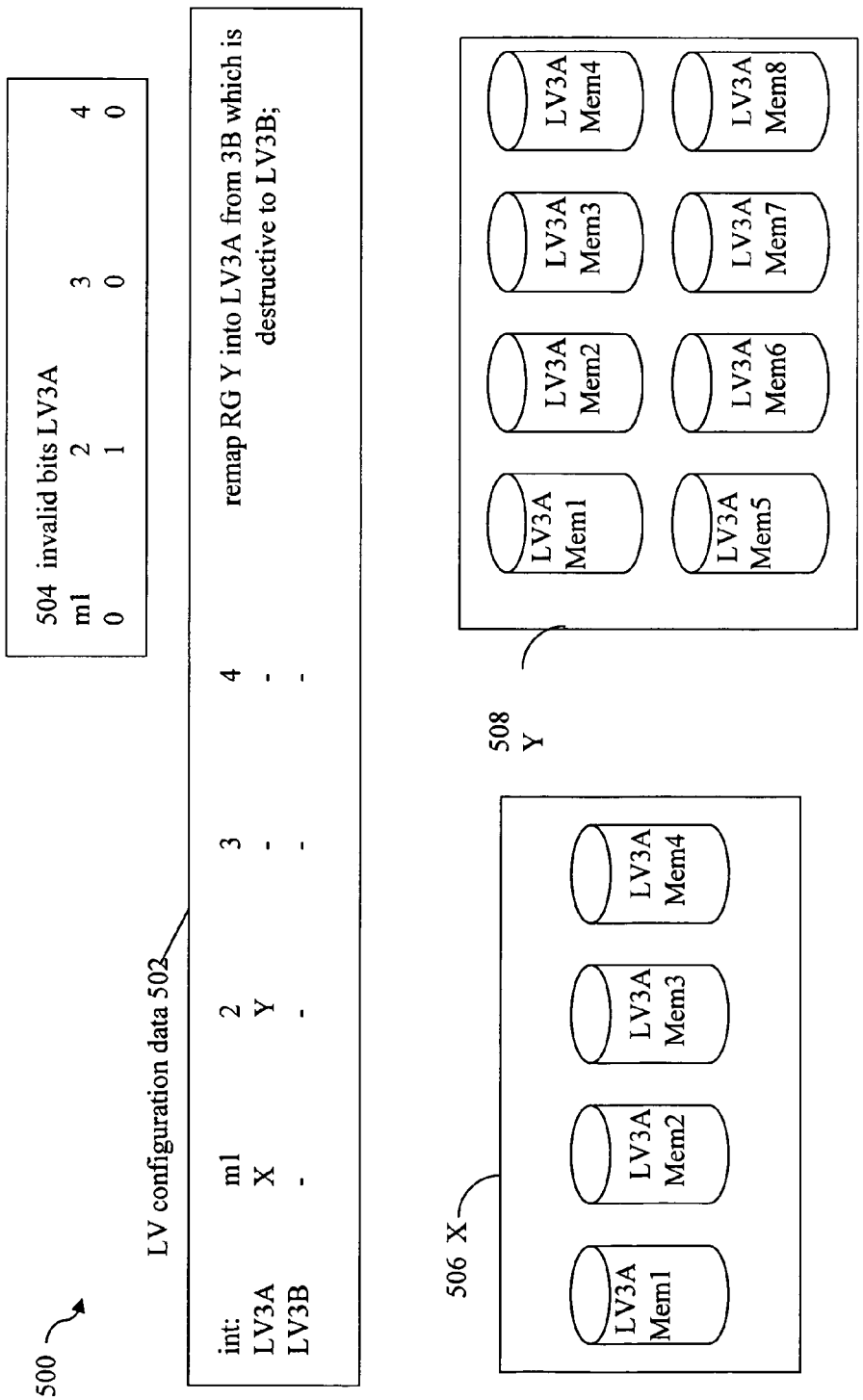

Referring to FIG. 11, shown is an example illustrating first processing steps in connection with the configured storage migration. The LV configuration data 502 indicates the RAID group Y is remapped from LV3B to LV3A which results in destruction of LV3B data stored on the storage of Y. As described above in connection with the unconfigured space migration, the Y RAID group mapped to the m2 mirror position of LV3A is invalidated across all tracks thereof as represented by the invalid bit=1 for m2 in element 504. Additionally, all members of RAID group Y are indicated as inconsistent in the PC structures thereof reflecting the internal state of the user data and protection information (such as parity information). At this point, RAID group Y is ready to accept I/Os.

The processing and state represented by FIG. 11 are similar to that as described in connection with RG6 of FIG. 4 for the unconfigured storage migration with a difference that different LVs and associated storage of RAID groups are mapped. Setting the invalid bits=1 for tracks of m2 causes the data storage system to perform processing to synchronize m2 using a valid copy of LV3A, such as the data of m1.

Figure 12:
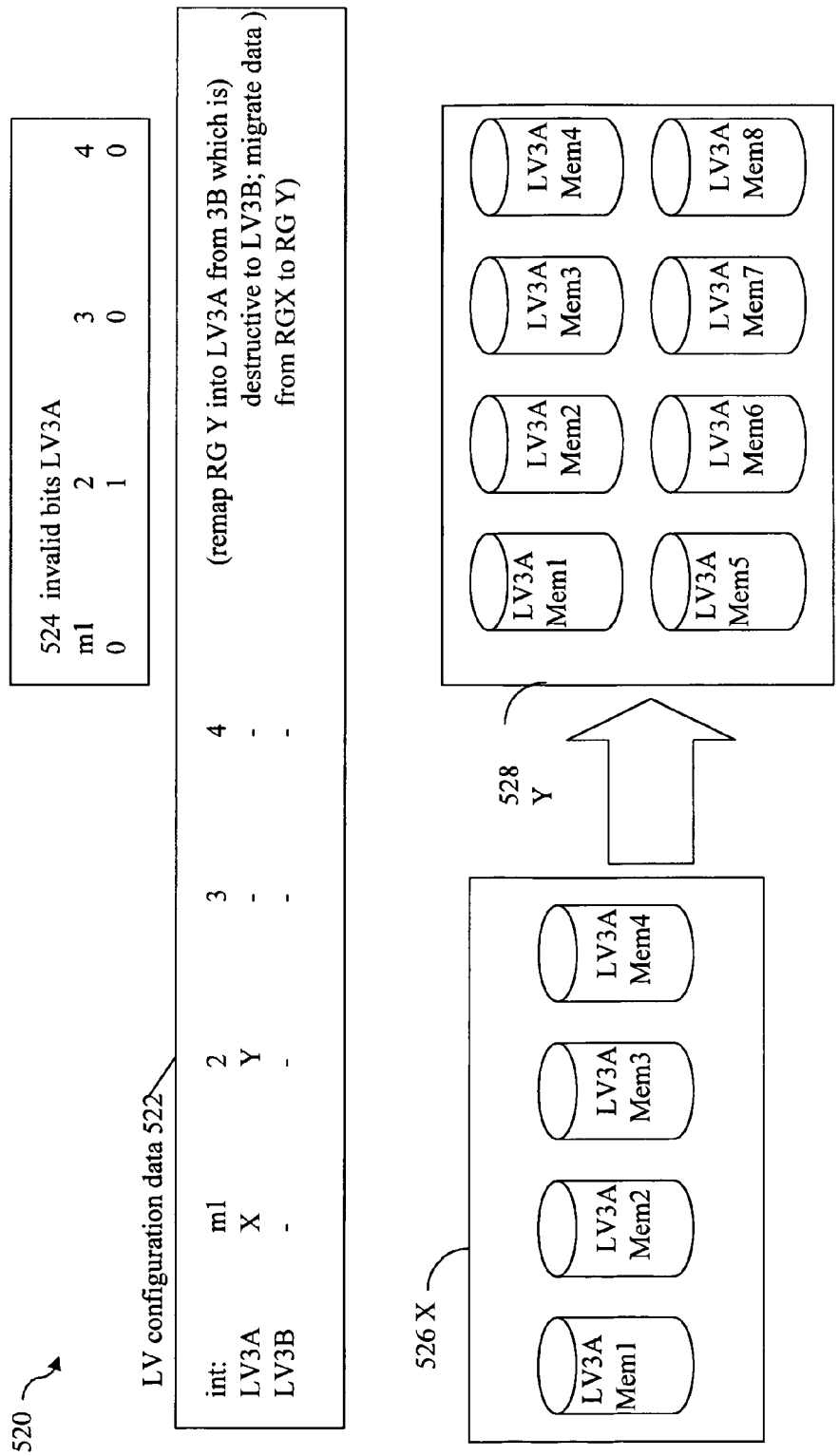

Referring to FIG. 12, shown is an example illustrating a second set of processing steps in connection with configured storage migration. Synchronization of LV3A data from m1 (RAID group X) to m2 (RAID group Y) is illustrated. FIG. 12 processing and illustration are similar to that as described in connection with FIG. 5 for the unconfigured storage migration. The invalid bits for all tracks of m2 are currently set to 1. As each track of data is migrated from m1 to m2, the associated invalid bit is cleared (=0). In one embodiment, the invalid bit for a track of m2 may be cleared when that track of data is stored in cache. At a subsequent point in time, the track of data will be written out to physical storage associated with m2. Thus, in accordance with one embodiment using the techniques herein, the invalid bit for a track of m2 may be cleared even though that track of data may not be written out to physical storage associated with m2.

Figure 13:
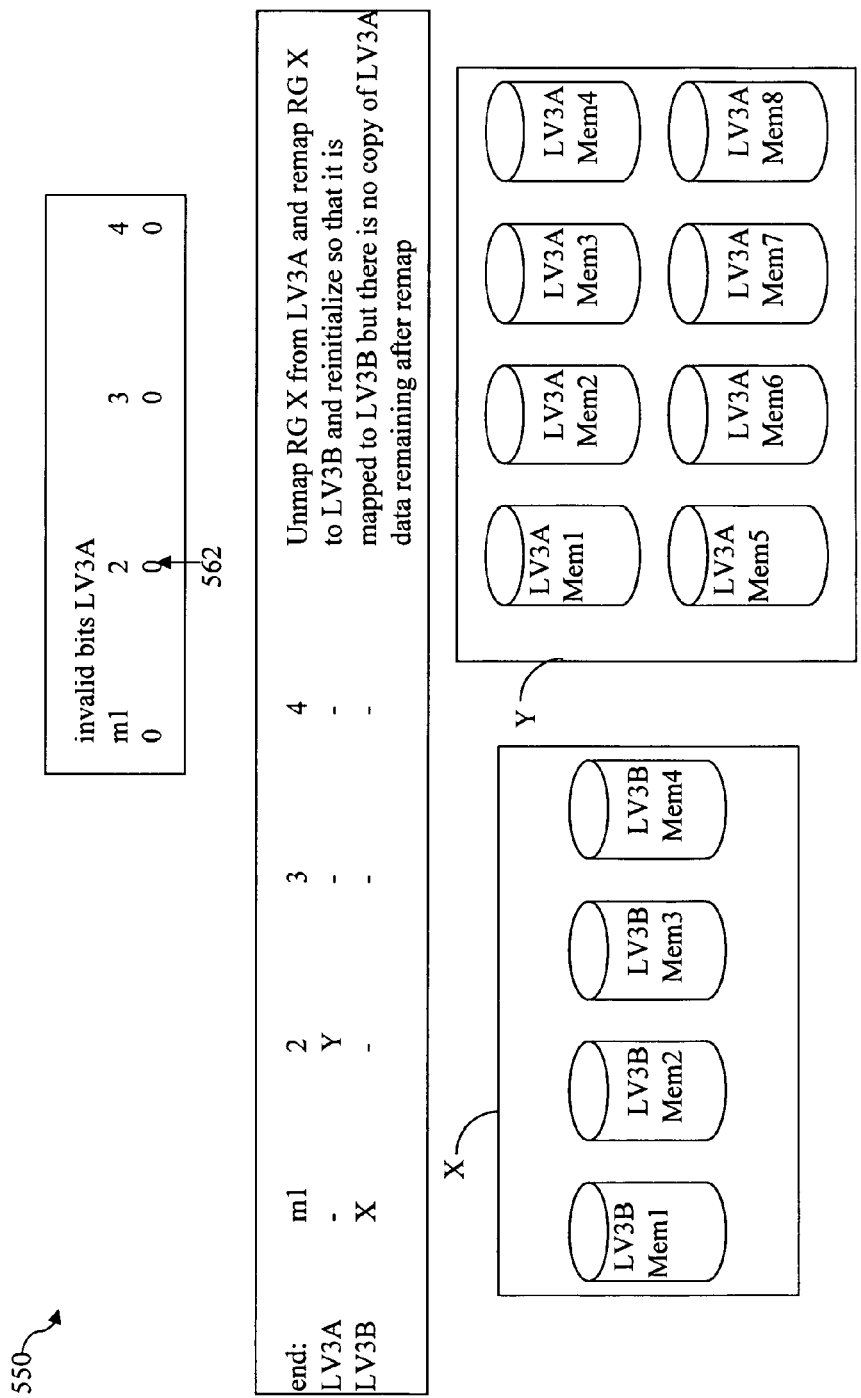

Processing is performed, such as by the service processor, to monitor the state of invalid bits for all tracks of m2 of LV3A. With reference to FIG. 13, processing is performed to monitor when all such invalid bits for all tracks of m2 LV3A are cleared as represented by 562. When the foregoing state is reached as represented by 562, a configuration change is made to unmap RAID group X from LV3A and remap RAID group X as a mirror of LV3B. Additionally, storage of RAID group X may be reinitialized. Processing of FIG. 13 is similar to processing described in connection with FIG. 6 for unconfigured data migration with a difference that different LVs and associated storage of RAID groups are unmapped and remapped.

Figure 13A:
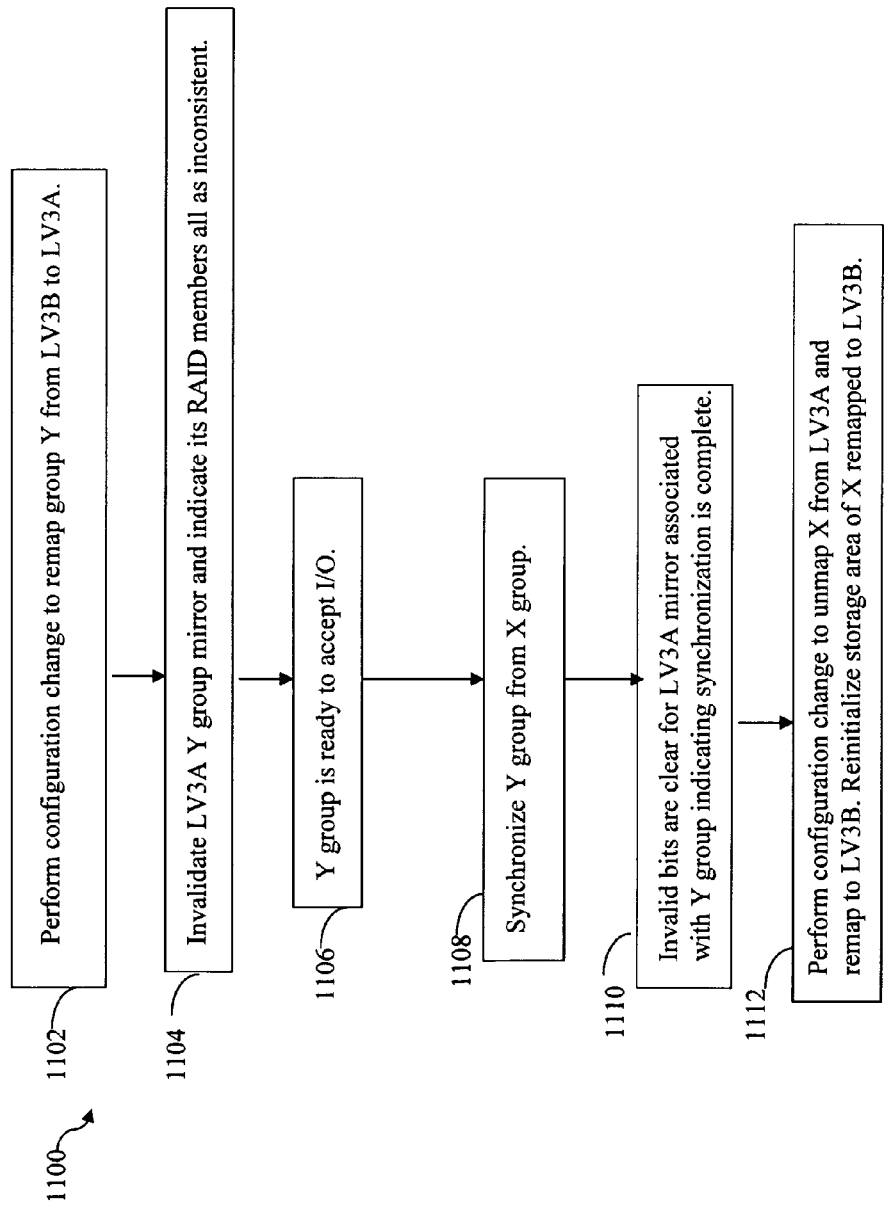

Referring to FIG. 13A, shown is a flowchart of processing steps as may be performed in an embodiment for configured storage migration as just described above. The flowchart 1100 summarizes processing described above with reference to the particular example. However, as will be appreciated by those skilled in the art, the techniques described may be applied in connection with other protection levels and variations than as described herein. Steps 1102, 1104 and 1106 are as described and illustrated above in connection with FIG. 11. At step 1102, a configuration change is made to remap RAID GROUP Y from LV3B to LV3A. At step 1104, processing is performed to invalidate the LV3A Y RAID group mirror m2 (e.g., setting invalid bits for all tracks of the mirror m2) and indicate the members of RAID group Y all as inconsistent (e.g., per the PC structures used internally by the RAID group). At step 1106, the RAID group Y is ready to accept I/O.

At step 1108, RAID group Y (m2 of LV3A) is synchronized from RAID group X (m1 of LV3A). Synchronization of step 1108 may include performing processing similar to steps 1020, 1022 and 1024 of FIG. 6A. Step 1108 processing is as described above such as in connection with FIG. 12.

In step 1110, the invalid bits for the mirror m2 associated LV3A are clear (=0) indicating that m2 contains a valid copy of all tracks of LV3A although there may be internal physical inconsistency within the RAID group associated with m2. At step 1112, a configuration change is performed to unmap X from m1 of LV3A and remap X to LV3B. Additionally, the storage area of X (which is remapped to LV3B) may be reinitialized so as not to leave a copy of the LV3A data thereon. Steps 1110 and 1112 are similar to that as described above such as in connection with FIG. 13.

It should also be noted that steps 1104-1110 of FIG. 13A are similar, respectively, to step 1004-1010 of FIG. 6A.

What will now be described is a third example illustrating use of techniques described herein in connection with data storage migration between two LVs where the physical disk location of such data is swapped. In this example, both the source and target storage locations are currently configured and mapped to LVs. The data from the source LV is written to physical storage devices mapped to the target LV, and the data from the target LV is written to physical storage devices mapped to the source LV. It will be appreciated by those skilled in the art that steps described below in connection with performing LV swap processing in accordance with data migration techniques herein are similar to other processing as described above in connection with the unconfigured and configured space migration cases. The LV swap processing may be performed, for example, by a data storage optimizer of the data storage system (such as a data storage array). The optimizer may physically relocate LVs to different physical storage devices using the LV swap processing described herein for data storage system performance reasons such as, for example, in connection with load balancing. An example of the optimizer such as may be used in connection with performing LV swap processing using the techniques herein is described, for example, in U.S. Pat. No. 7,281,105, which is incorporated by reference herein.

Figure 14:
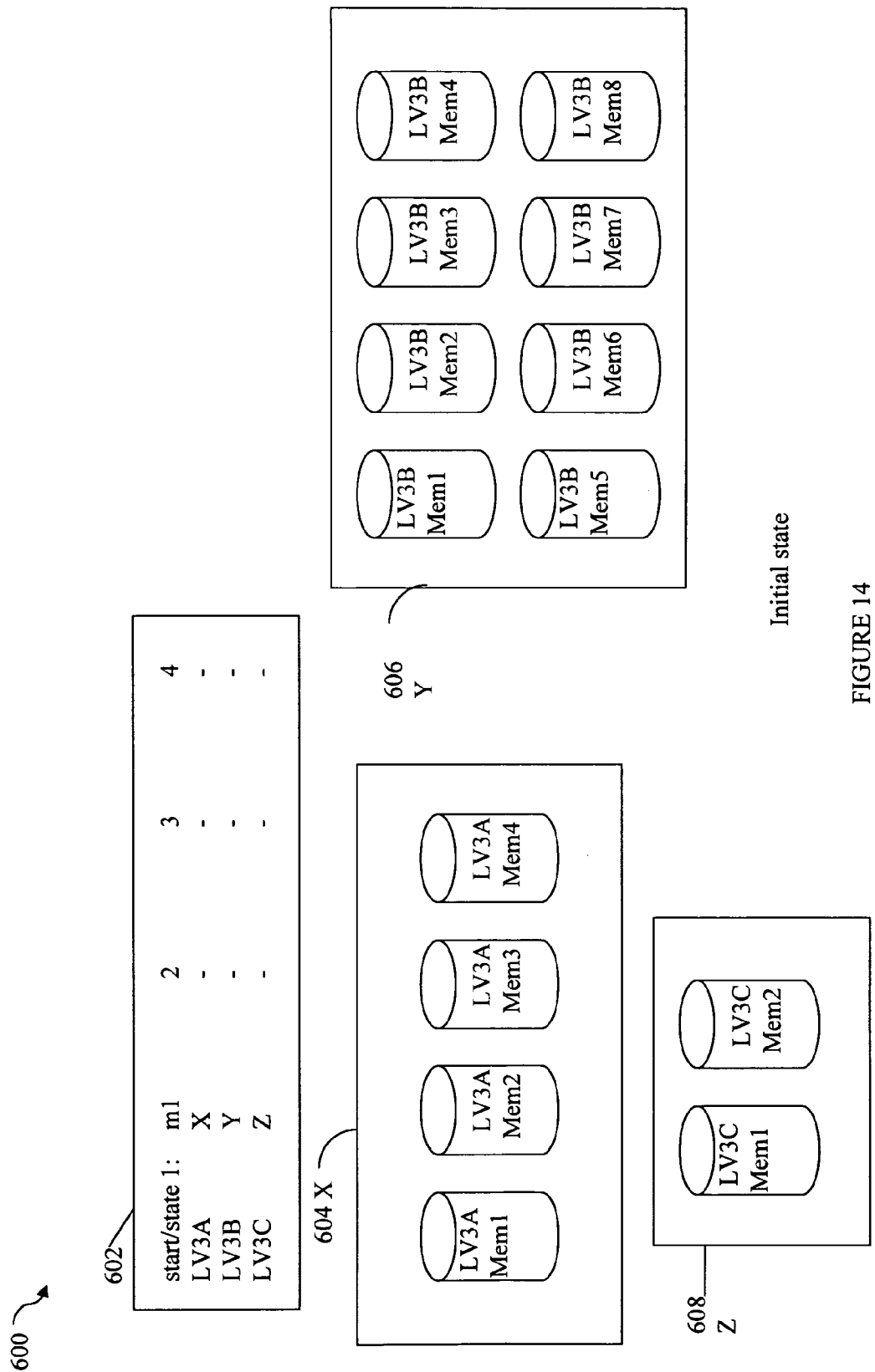

Referring to FIG. 14, shown is an example of storage configuration prior to data migration. The example 600 includes LV configuration data 602 for LV3A, LV3B, and LV3C. LV3A has only a single mirror m1 associated therewith which is mapped to storage of a RAID-5 group (X 604) having a 3×1 RAID configuration. LV3B has only a single mirror m1 associated therewith which is mapped to storage of a RAID-6 group (Y 606) having a 6×2 RAID configuration. LV3C has only a single mirror m1 associated therewith which is mapped to storage of a RAID-1 group (Z 608). In this example LV3C may be a DRV (Dynamic reallocation volume) that may used as a temporary volume to hold user data when performing processing and operations as described herein with the swap via data migration techniques. One way in which the swap between a source LV and target LV may be performed includes migrating the source LV data to the DRV storage area, migrating the target LV data onto the source LV storage area and then migrating the copy of the source data as temporarily stored on the DRV to target LV storage area.

Figure 17:
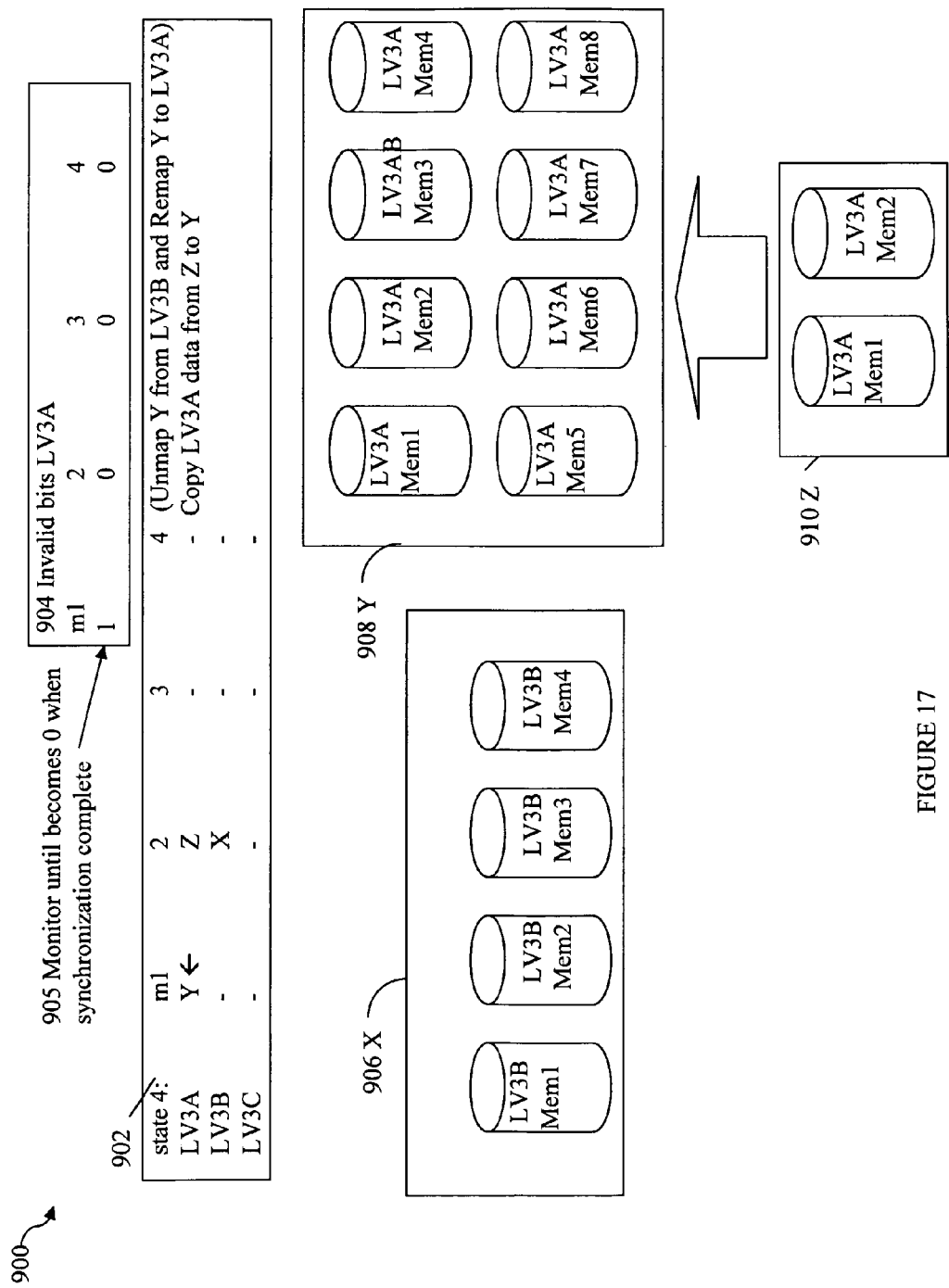
Figure 18:
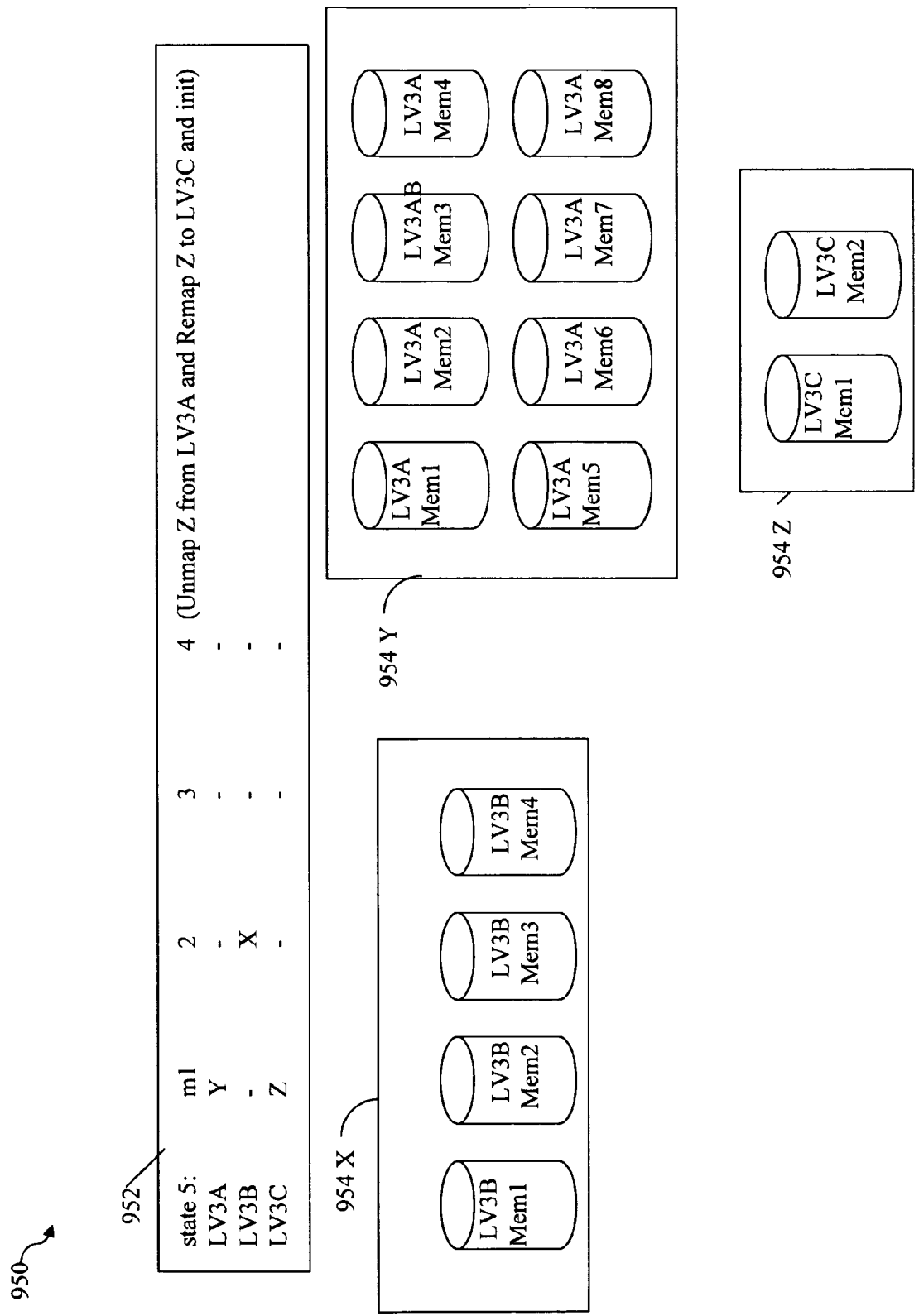
Figure 18A:
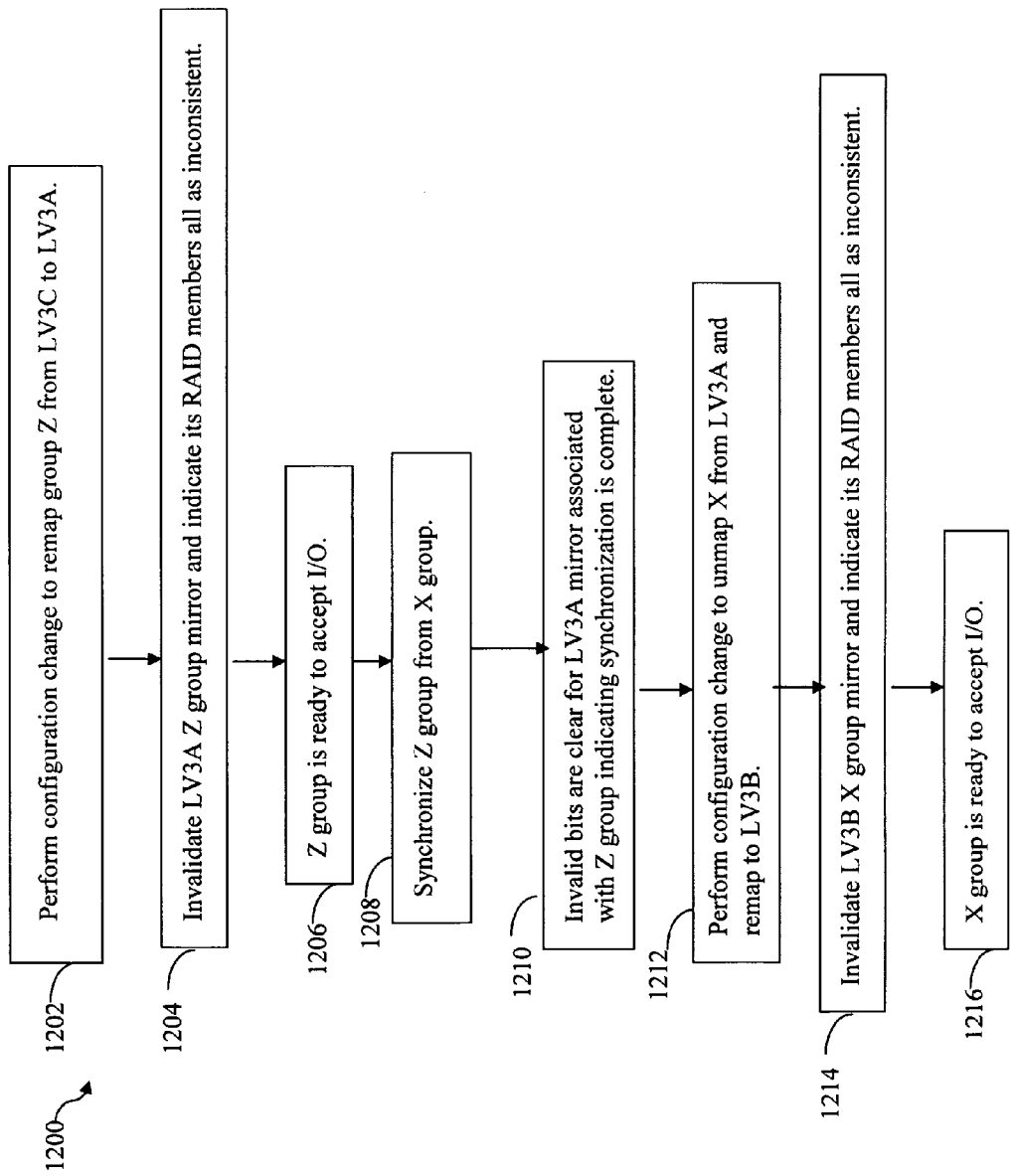

It should be noted that FIGS. 18A and 18B are flowcharts summarizing processing steps as will be described in following paragraphs in connection with FIGS. 15, 16, 17 and 18. As such, reference will be made to which of the steps of the flowchart from FIGS. 18A and 18B are relevant to processing illustrated in FIGS. 15, 16, 17 and 18.

Figure 15:
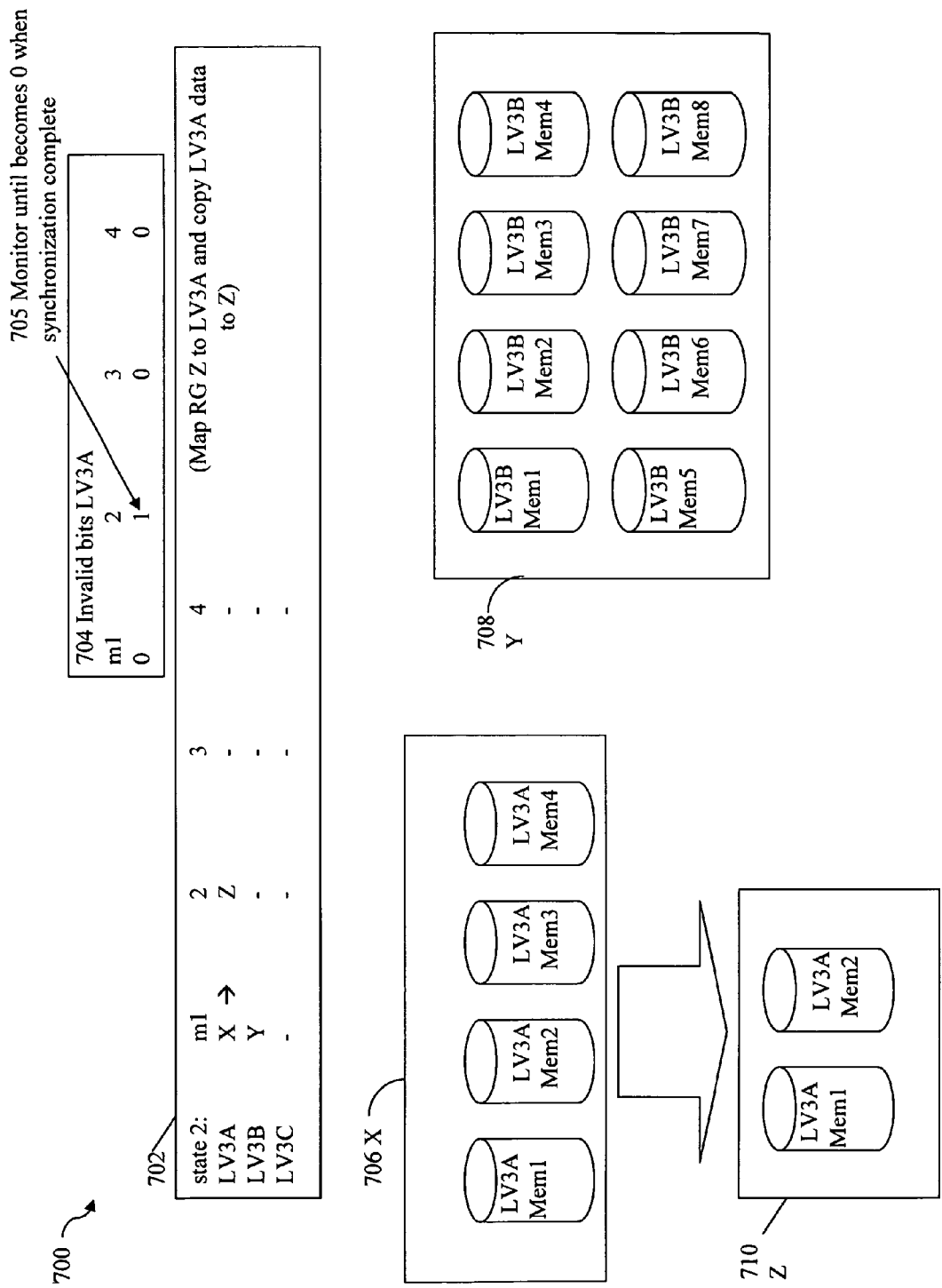

Referring to FIG. 15, shown is a first illustration of processing steps in connection with performing an LV swap for data migration in accordance with techniques herein. As shown in FIG. 15, the configuration data 702 is updated to map RAID group Z from m1 of LV3C to m2 of LV3A (see step 1202 of FIG. 18A). As represented by element 704, the invalid bits for all tracks of m2 LV3A are set=1 (see step 1204 of FIG. 18A) causing the DA to perform processing to synchronize m2 of LV3A with a valid copy of LV3A, such as m1 of LV3A (see step 1208 of FIG. 18A). Additionally, the associated PC structure for RAID group Z is updated to indicate the physical inconsistent state of the entire RAID group Z (see step 1204 of FIG. 18A). It should be noted that once the LV3A Z group mirror has been invalidated and its associated RAID Z group members are indicated as physically inconsistent, the Z group mirror is ready to accept I/O (see step 1206 of FIG. 18A). Processing is performed to monitor the progress of the synchronization (e.g., copying from RAID group X m1 to RAID group Z m2) and determine when all invalid bits for all tracks of m2 are cleared (e.g., =0 as indicated by 705).

Figure 16:
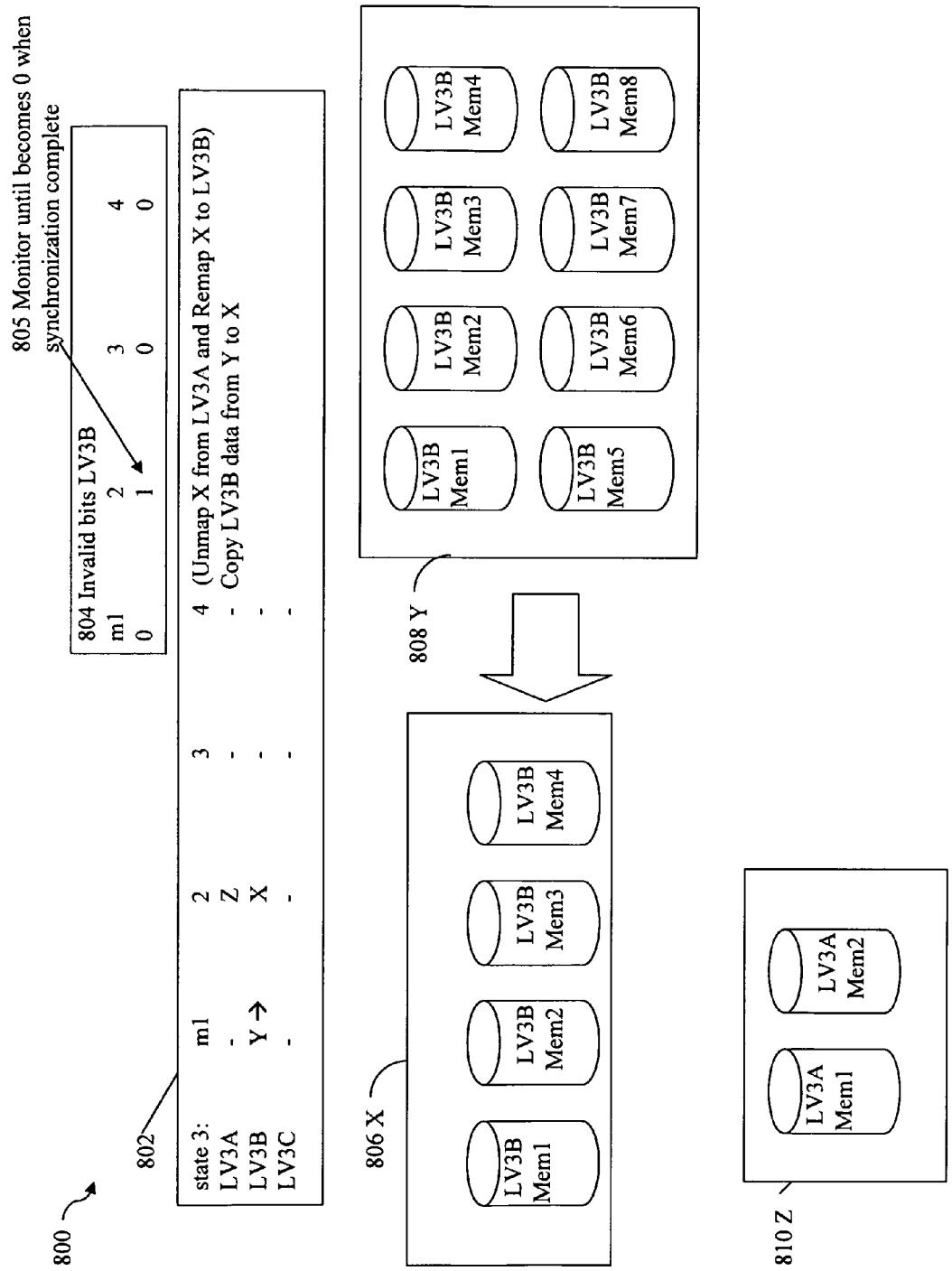

When all such invalid bits are cleared for m2 (see step 1210 of FIG. 18A), processing proceeds as illustrated in FIG. 16 where RAID group X is unmapped from LV3A and remapped to m2 LV3B as represented by configuration data 802 (see step 1212 of FIG. 18A). As represented by element 804, the invalid bits for all tracks of m2 LV3B are set=1 (see step 1214 of FIG. 18A) causing the DA to perform processing to synchronize m2 of LV3B with a valid copy of LV3B, such as m1 of LV3B (see step 1252 of FIG. 18B). Additionally, the associated PC structure for RAID group X is updated to indicate the physical inconsistent state of the entire RAID group X (see step 1214 of FIG. 18A). Once the LV3B X group has been invalidated the associated PC structure updated to reflect the physical inconsistent state of the RAID group, RAID group X is ready to accept I/O (see step 1216). Processing is performed to monitor the progress of the synchronization (e.g., copying from RAID group Y m1 to RAID group X m2; see step 1252 of FIG. 18B) and determine when all invalid bits for all tracks of m2 are cleared (e.g., =0 as indicated by 805) (see step 1254 of FIG. 18B).

When all such invalid bits are cleared for m2, processing proceeds as illustrated in FIG. 17 where RAID group Y is unmapped from LV3B and remapped to m1 LV3A as represented by configuration data 902 (see step 1256 of FIG. 18B). As represented by element 904, the invalid bits for all tracks of m1 LV3A are set=1 (see step 1258 of FIG. 18B) causing the DA to perform processing to synchronize m1 of LV3A with a valid copy of LV3A, such as m2 of LV3A (See step 1262 of FIG. 18B). Additionally, the associated PC structure for RAID group Y is updated to indicate the physical inconsistent state of the entire RAID group Y (see step 1258 of FIG. 18B). Once the LV3A Y group mirror has been invalidated and its PC structure updated to reflect the physically inconsistent state within the Y group, the Y group is ready to accept I/O (see step 1260 of FIG. 18B). Processing is performed to monitor the progress of the synchronization (e.g., copying from RAID group Z m2 to RAID group Y m1) and determine when all invalid bits for all tracks of m1 are cleared (e.g., =0 as indicated by 905).

When all such invalid bits are cleared for m1 (see step 1264 of FIG. 18B), processing proceeds as illustrated in FIG. 18 where RAID group Z is unmapped from LV3A and remapped to m1 LV3C as represented by configuration data 952 (see step 1266 of FIG. 18B). Additionally, the storage of RAID group Z may be reinitialized.

In the previous data migration case for configured storage migration, the data on LV3B was destroyed and a copy of such data was not otherwise stored in another location. In connection with the LV swapping, the data of the source and target LVs is swapped. It should be noted that those of ordinary skill in the art will appreciate that other processing may be performed in connection with swapping the data of the source and target LVs. For example, two different DRVs may be used rather than a single DRV. The source LV may have m1=RAID group X which is copied via synchronization (e.g., using invalid bit setting) to a first DRV mapped as m2 of the source LV. The target LV may have m1=RAID group Y which is copied via synchronization (e.g., using invalid bit setting) to a second DRV mapped as m2 of the target LV. The RAID group X may then be remapped from the source LV as a mirror of the target LV. Similarly, the RAID group Y may be remapped from the target LV as a mirror of the source LV. Subsequently, data from DRV1 may be copied to RAID group Y via synchronization (e.g., using invalid bit setting) and data from DRV2 may be copied to RAID group X via synchronization.

In connection with each of the foregoing three exemplary use cases of unconfigured LV migration, configured LV migration and LV swapping, processing performed may be restartable and an embodiment may store sufficient information persistently to enable processing to resume, for example, upon the occurrence of an unexpected event that interrupts processing, in the event that the system and/or components are powered down, and the like. As described in more detail above for the unconfigured case, the source and target of the migration may have the same or different data protection levels, the same or different physical device characteristics or attributes, and the like. For example, the physical storage of the data for the source and target devices may have the same or different physical storage characteristics (e.g., such as capacity, characteristics related to performance such as speed, and the like), drive types (e.g., SATA, FC or non-FC), may use flash memory or disk for storage, and the like.

In all the above-referenced cases, the data migration may be performed in a transparent and non-disruptive manner with respect to an application accessing and using the data being migrated. For example, the data migration may be performed using production or live data without stopping and restarting an application and allowing the application to continuously perform I/O operations and access the data during the migration process. Furthermore, the data migration may be performed without disrupting local (e.g., making a local snapshot for backup) and/or remote replication (e.g., using RDF where the data being migrated to another LV is also being replicated remotely at another data storage system physically located at another site or location) processing. Furthermore, in connection with all the use cases, a single RAID group may be associated with storage that is mapped to one or more LVs such as one or more mirrors of the same LV or different LVs.

The techniques described above may be performed when migrating data within a single data storage system such as a single data storage array.

What will now be described in more detail are exemplary data structures that may be used in an embodiment in connection with the techniques herein.

Figure 19:
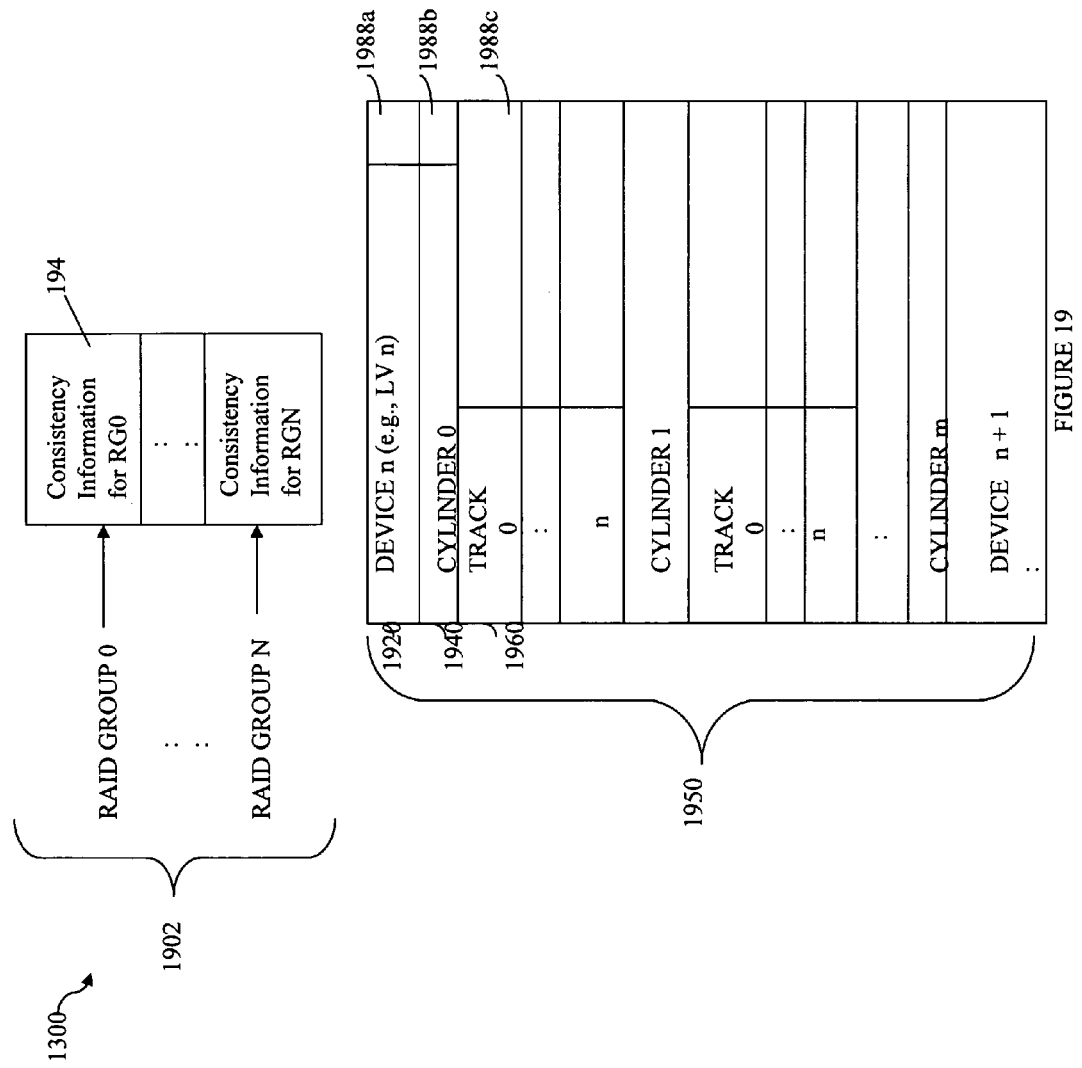
FIGS. 19, 20 and 21 are examples of structures that may be used in an embodiment in accordance with the techniques herein.

Referring to FIG. 19, shown is a representation of consistency information and device information that may be used in an embodiment in accordance with techniques herein. The example 1300 includes a structure 1902 of consistency information for each RAID group. In an embodiment described herein, consistency information may be stored for each RAID group rather than per LV, for example, as described in the '574, since storage from multiple RAID groups may be mapped to multiple mirrors of a same LV as described herein. With reference to 1902, each set 194 of consistency information for a RAID group may include information as represented in connection with FIG. 5 in the '574 application. It will be appreciated that the techniques and structures described in the '574 application may be utilized in connection with any RAID level.

For each LV, a device table or track id table 1950 may be stored in global memory of the data storage system. The table 1950 may be one of multiple tables containing information for each logical device or LV. The table 1950 may include a hierarchical structure relative to the structure of a disk, such as cylinders and tracks on a disk. Each of the portions 1950 for a device, such as an LV, may further be divided into sections in accordance with the disk structure. The table 1950 may include device header information 1920, information for each cylinder 1940 and for each track within each cylinder 1960. For a device, a bit indicator 1988a may indicate whether data associated with the device is stored in cache. The bit indicator 1988b may further indicate for a particular cylinder within a device, is any data stored in the cache. Associated with each track may be a corresponding portion 1988c indicating information about the particular data track.

The LV track id table 1950 may also include the invalid bits described elsewhere herein. For each mirror, a set of one or more invalid bits may be provided where there is a single invalid bit in the set for each track of the LV. If an LV can have up to 4 mirrors, storage may be included in the table 1950 for four such sets of invalid bits, one set of invalid bits for each of the four mirrors. In one embodiment, storage for the foregoing invalid bits may be included in the header 1920 of the LV track id table. An embodiment may alternatively store the invalid bits at other locations within the track id table (e.g., within entries 1988c for each track), or another location.

As described elsewhere herein, an invalid data bit value indicates whether a RAID group storing data for a corresponding track can provide a most recent copy of data for the track. In other words, the invalid data bit does not reflect the internal RAID group consistency but rather indicates whether the data provided by the RAID group for the track is the most recent copy of the data. The invalid bit may be set (e.g., to indicate that the RAID group cannot provide the most recent copy of the data) for a variety of different reasons in addition to the use as described herein for synchronization processing which sets an invalid bit to indicate that the data for the particular track of the RAID group needs to be updated. When the data of the RAID group is updated, the invalid bit may be appropriately cleared to indicate that the RAID group can provide a most recent copy of the data. The internal consistency of the RAID group is reflected using a different technique and data portions in accordance with the consistency information as described elsewhere herein.

Information may be stored in the track id table indicating whether each track of the LV is mirrored. For example, with reference to the table 1950, mirroring information may be stored in 1988c for each track indicating a number of data mirrors. In one embodiment of the track id table, each track entry may have 4 bits used to indicate whether the track data is mirrored on up to 4 mirrors.

The information represented in the structures of the example 1300 may be stored in global memory of the data storage system.

Other structures such as may be used to represent information included in configuration data will now be described. Some information represented in the configuration data, such as with respect to LV configuration data, is described above. Configuration data for a data storage system may be loaded from a service processor connected to the data storage system. Each director may have a copy of those portions of the configuration data it needs.

Figure 20:
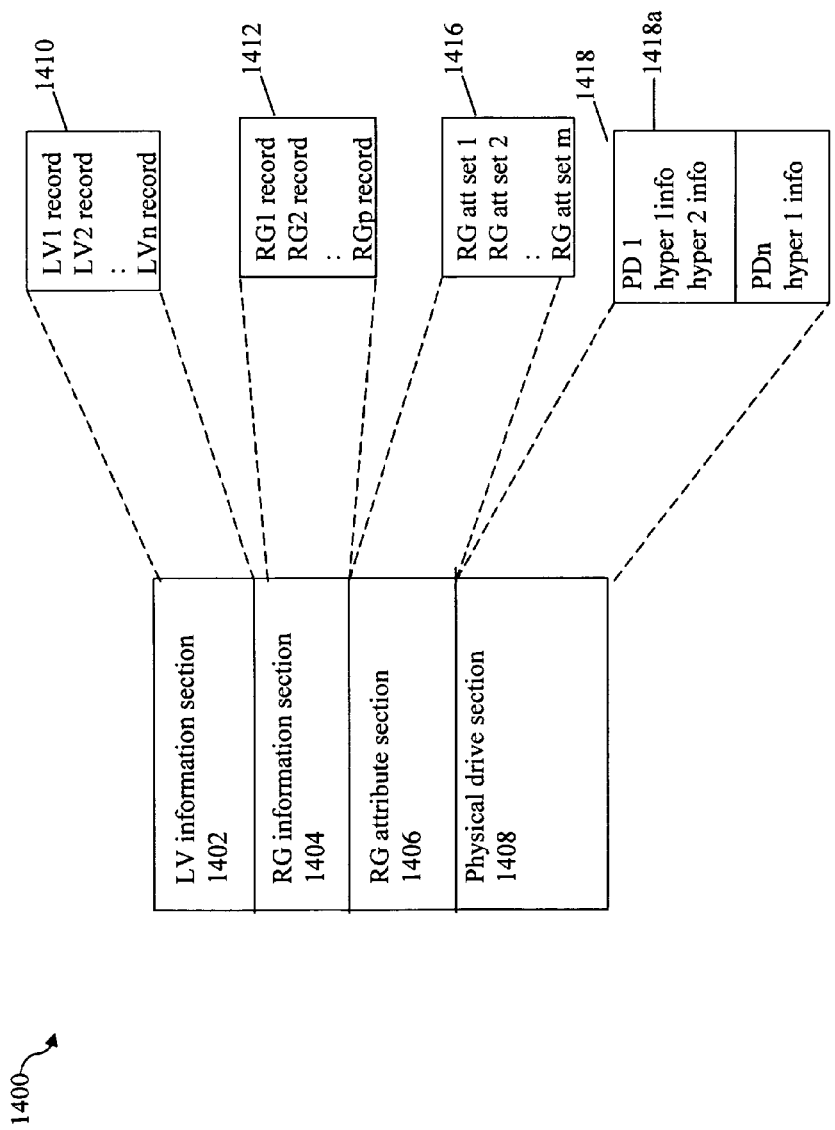

Referring to FIG. 20, shown is an example representation of information that may be included in configuration data in an embodiment in accordance with techniques herein. The example 1400 illustrates that configuration data may include LV information section 1402, RG (RAID group) information section 1404, RG attribute section 1406 and a physical drive section 1408. The LV information section 1402 may include a record for each LV as represented by 1410. The RG information section 1404 may include a record for each defined RG as represented by 1412. The RG attributes section 1406 may include a record for each set of RG attributes as represented by 1416. The physical drive section 1408 may include a record 1418a for each PD of the data storage system where the record 1418a includes information for each hyper of the PD (e.g., denoted hyper1 info, etc.).

Figure 21:
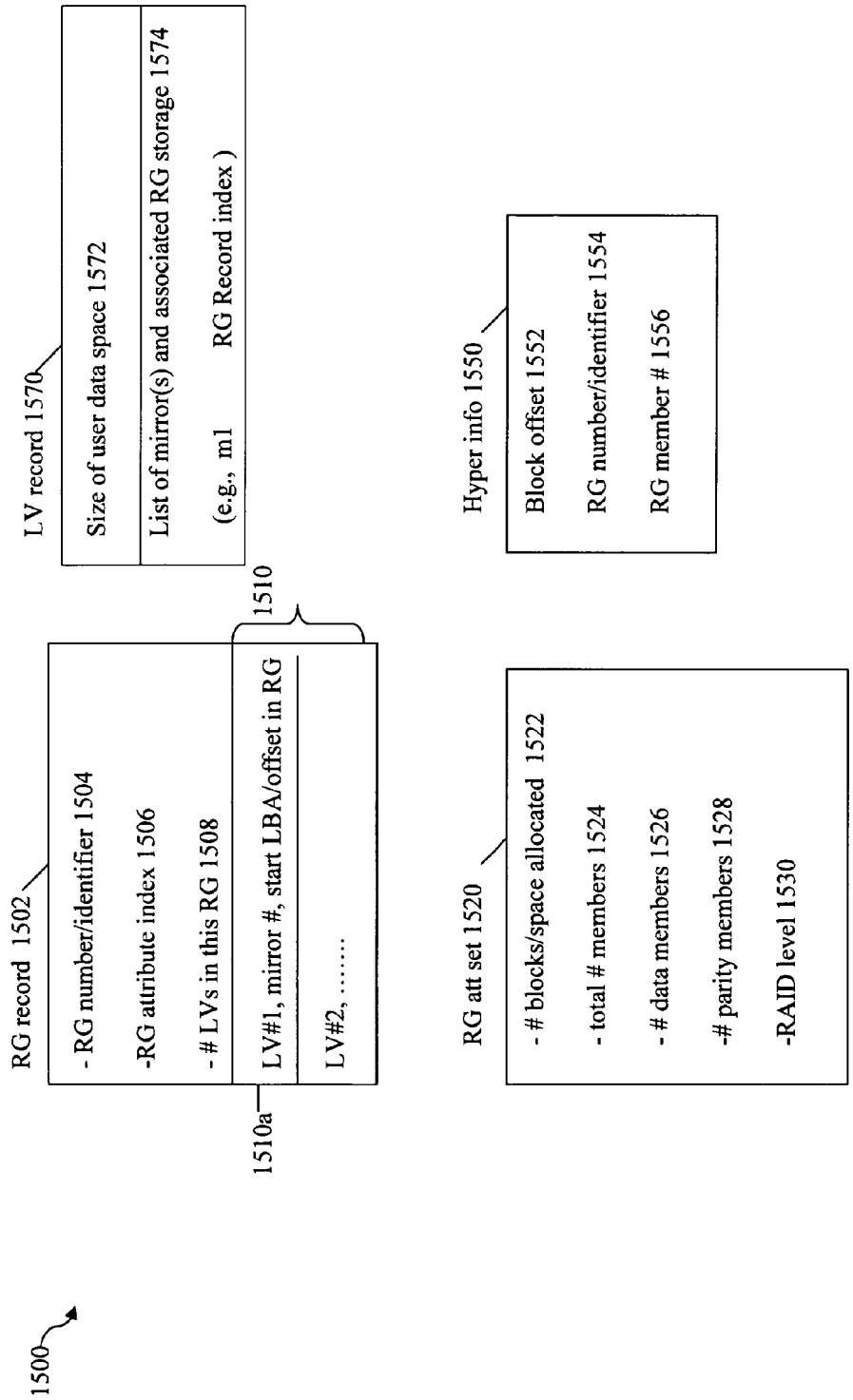

Referring to FIG. 21, shown is an example illustrating additional detail for portions of the information of FIG. 20 as may be utilized in an embodiment in connection with techniques herein. The example 1500 provides additional detail about an RG record 1502, an RG attribute (att) set 1520, hyper info 1550, and an LV record 1570.

Each RG record 1502 describing an existing RG may include a RG number or identifier 1504 (such as a name or number for the RG), an RG attribute index 1506 (an index uniquely identifying the RG attribute set instance 1520 within the RG attribute information section 1406), and the number of LVs having storage within this RG 1508. Each RG record 1502 may also include a list 1510 of LV entries for all LVs having storage within the RG. Element 1508 indicates the number of entries within 1510. Each entry 1510a may be included for each LV having storage within the RG and may include an LV# (or LV identifier), a mirror # (identifying the mirror number for the LV# where the mirror is mapped to the storage of the RG associated with the record 1502), and a starting LBA (logical block address) or offset within the RG (where the offset identifies a location within the RG where storage for the LV begins).

An RG attribute set record 1520 may exist for each unique set of RG attributes. It should be noted that a same set of RG attributes or instance of 1520 may be used to indicate the attributes of two different RG instances having the same RG attributes. RG attribute set record 1520 may include a number of blocks or amount of space allocated 1522 for the RG, a total number of RG members 1524, a number of data members 1524, a number of parity members 1528 and a RAID level 1530 (e,g, RAID 0, 1, 3, 5, 6, 10, etc.)

A hyper info record 1550 may be defined for each hyper-volume and may include a block offset 1552 (identifying an offset within the physical drive at which this hyper begins), an RG number or identifier 1554 (e.g., 1554 may index into and identify a particular RG record 1502 in the RG information section 1404), and an RG member number 1556 (identifying the RG member of the RG which corresponds to this hyper).

An LV record 1570 may be defined for each LV and may identify the size of the user data space 1572 provided by this LV, and a list of one or more mirrors and associated RG storage 1574. Element 1574 may include information for each LV mirror and may identify a RG record index of the RG storage associated with this mirror. The foregoing RG record index may identify a particular instance of 1502 within the RG information section 1404.

It should be noted that an embodiment may also include other information in the configuration data and use other structures than as described above for use with the data migration techniques described herein.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing data migration in a data storage system comprising:
    identifying a source logical volume of the data storage system, said source logical volume having at least a first mirror mapped to first storage;
    identifying a target included in the data storage system, wherein if the target is unconfigured storage of the data storage system, the target is mapped as storage for another mirror of the source logical volume prior to copying data from the source logical volume to the target, and if the target is configured storage of another logical volume of the data storage system, the configured storage is remapped as storage for another mirror of the source logical volume prior to copying data from the source logical volume to the target;
    setting one or more invalid bits indicating that the target does not contain a valid copy of data from the source logical volume; and
    copying data from the first mirror of the source logical volume to the target and clearing one or more invalid bits as one or more data portions of the first mirror of the source logical volume corresponding to said one or more invalid bits are copied to the target, wherein storage for the first mirror of the source logical volume is included in a first RAID group and storage for the target mapped as a second mirror of the source logical volume is included in a second RAID group having a different RAID level than the first RAID group.

2. The method of claim 1, wherein each of the one or more invalid bits is set to clear when a corresponding data portion of the first mirror of the source logical volume is written to cache and prior to destaging the corresponding data portion to a physical device upon which data of the target is stored.

3. The method of claim 1, wherein said setting the invalid bit causes a disk adapter of the data storage system to perform said copying.

4. The method of claim 1, wherein said data migration is performed without stopping I/O operations from an application accessing the source logical volume.

5. The method of claim 1, wherein said data migration is performed without interrupting a data replication service which replicates data of the source logical volume, said data replication service including at least one local replication service making a backup copy of data of the source logical volume at a same physical site as the data storage system or at least one remote replication service copying data of the source logical volume to another data storage system at another physical site.

6. The method of claim 1, wherein storage for the first mirror of the source logical volume has a first level of data protection, storage for the target is attached as the second mirror of the source logical volume, and the storage of the second mirror has a second level of data protection different from the first mirror.

7. The method of claim 1, wherein data for the first mirror of the source logical volume is stored on at least a portion of a first physical device having a first set of characteristics, storage for the target is attached as a second mirror, and at least a portion of the storage of the second mirror is on a second physical device having a second set of characteristics different from the first set.

8. The method of claim 7, wherein the first physical device for the first mirror is one of a disk device or a flash-memory device and the second physical device for the second mirror is the other of the disk device or the flash-memory device.

9. The method of claim 7, wherein the first physical device has a first storage capacity and the second physical device has a second storage capacity different from the first storage capacity.

10. The method of claim 6, wherein the first RAID group includes storage for the first mirror and storage mapped to another mirror of a logical volume other than the source logical volume.

11. The method of claim 6, wherein the first RAID group includes storage of the first mirror and unconfigured storage which is not currently mapped for use with any logical volume.

12. A non-transitory computer readable medium comprising code stored thereon that performs data migration in a data storage system, the computer readable medium comprising code stored thereon that, when executed by a processor, performs a method comprising:
    identifying a source logical volume of the data storage system, said source logical volume having at least a first mirror mapped to first storage;
    identifying a target included in the data storage system, wherein if the target is unconfigured storage of the data storage system, the target is mapped as storage for another mirror of the source logical volume prior to copying data from the source logical volume to the target, and if the target is configured storage of another logical volume of the data storage system, the configured storage is remapped as storage for another mirror of the source logical volume prior to copying data from the source logical volume to the target;
    setting one or more invalid bits indicating that the target does not contain a valid copy of data from the source logical volume; and
    copying data from the first mirror of the source logical volume to the target and clearing one or more invalid bits as one or more data portions of the first mirror of the source logical volume corresponding to said one or more invalid bits are copied to the target, wherein storage for the first mirror of the source logical volume is included in a first RAID group and storage for the target mapped as a second mirror of the source logical volume is included in a second RAID group having a different RAID level than the first RAID group.

13. The non-transitory computer readable medium of claim 12, wherein each of the one or more invalid bits is set to clear when a corresponding data portion of the first mirror of the source logical volume is written to cache and prior to destaging the corresponding data portion to a physical device upon which data of the target is stored.

14. The non-transitory computer readable medium of claim 12, wherein said setting the invalid bit causes a disk adapter of the data storage system to perform said copying.

15. The non-transitory computer readable medium of claim 12, wherein said data migration is performed without stopping I/O operations from an application accessing the source logical volume.

16. The non-transitory computer readable medium of claim 12, wherein said data migration is performed without interrupting a data replication service which replicates data of the source logical volume, said data replication service including at least one local replication service making a backup copy of data of the source logical volume at a same physical site as the data storage system or at least one remote replication service copying data of the source logical volume to another data storage system at another physical site.

17. The non-transitory computer readable medium of claim 12, wherein storage for the first mirror of the source logical volume has a first level of data protection, storage for the target is attached as the second mirror of the source logical volume, and the storage of the second mirror has a second level of data protection different from the first mirror.

18. The non-transitory computer readable medium of claim 12, wherein data for the first mirror of the source logical volume is stored on at least a portion of a first physical device having a first set of characteristics, storage for the target is attached as the second mirror, and at least a portion of the storage of the second mirror is on a second physical device having a second set of characteristics different from the first set.

19. The non-transitory computer readable medium of claim 18, wherein the first physical device for the first mirror is one of a disk device or a flash-memory device and the second physical device for the second mirror is the other of the disk device or the flash-memory device, and wherein the first physical device has a first storage capacity and the second physical device has a second storage capacity different from the first storage capacity.

20. A data storage system comprising:
    one or more physical devices configured to store data for a plurality of logical volumes including a source logical volume; and
    a non-transitory computer readable medium comprising code stored thereon that, when executed by a processor, performs a method comprising:
        identifying a source logical volume of the data storage system, said source logical volume having at least a first mirror mapped to first storage;
        identifying a target included in the data storage system, wherein if the target is unconfigured storage of the data storage system, the target is mapped as storage for another mirror of the source logical volume prior to copying data from the source logical volume to the target, and if the target is configured storage of another logical volume of the data storage system, the configured storage is remapped as storage for another mirror of the source logical volume prior to copying data from the source logical volume to the target;
        setting one or more invalid bits indicating that the target does not contain a valid copy of data from the source logical volume; and
        copying data from the first mirror of the source logical volume to the target and clearing one or more invalid bits as one or more data portions of the first mirror of the source logical volume corresponding to said one or more invalid bits are copied to the target, wherein storage for the first mirror of the source logical volume is included in a first RAID group and storage for the target mapped as a second mirror of the source logical volume is included in a second RAID group having a different RAID level than the first RAID group.

* * * * *